(12) United States Patent
Ferrari et al.

(10) Patent No.: US 9,969,824 B2
(45) Date of Patent: May 15, 2018

(54) TRANSPARENT PEROXIDE CURABLE BUTYL RUBBER

(71) Applicants: LANXESS INC., Sarnia, Ontario (CA); THE UNIVERSITY OF WINDSOR, Windsor, Ontario (CA)

(72) Inventors: Lorenzo Ferrari, Burlington (CA); Natalie Suhan, London (CA); Conrad Siegers, Edmonton (CA); Tricia Breen Carmichael, Windsor (CA)

(73) Assignees: LANXESS, Inc., Sarnia, CA (US); The University of Windsor, Windsor, CA (US)

( * ) Notice: Subject to any disclaimer, the term of this patent is extended or adjusted under 35 U.S.C. 154(b) by 132 days.

(21) Appl. No.: 14/651,431

(22) PCT Filed: Dec. 13, 2013

(86) PCT No.: PCT/CA2013/001035
§ 371 (c)(1),
(2) Date: Jun. 11, 2015

(87) PCT Pub. No.: WO2014/094117
PCT Pub. Date: Jun. 26, 2014

(65) Prior Publication Data
US 2015/0376305 A1  Dec. 31, 2015

Related U.S. Application Data

(60) Provisional application No. 61/738,649, filed on Dec. 18, 2012.

(51) Int. Cl.
| | | |
|---|---|---|
| C08L 23/00 | (2006.01) |
| C08K 3/36 | (2006.01) |
| C08F 36/04 | (2006.01) |
| C08F 299/00 | (2006.01) |
| B05D 3/00 | (2006.01) |
| C09D 183/06 | (2006.01) |
| C08F 8/00 | (2006.01) |
| C08L 23/28 | (2006.01) |

(52) U.S. Cl.
CPC ............ *C08F 36/045* (2013.01); *B05D 3/007* (2013.01); *C08F 8/00* (2013.01); *C08F 299/00* (2013.01); *C08K 3/36* (2013.01); *C09D 183/06* (2013.01); *C08F 2810/20* (2013.01); *C08L 23/283* (2013.01); *C08L 2201/10* (2013.01); *C08L 2312/00* (2013.01)

(58) Field of Classification Search
CPC .. C08F 36/045; C08F 299/00; C08F 2810/20; C08L 23/283; C08L 2201/10; C08L 2312/00
USPC ........................... 524/574; 525/340; 427/385
See application file for complete search history.

(56) References Cited

U.S. PATENT DOCUMENTS

| | | | |
|---|---|---|---|
| 2,356,128 | A | 8/1944 | Thomas et al. |
| 9,045,626 | B2 | 6/2015 | Adkinson et al. |
| 9,388,258 | B2 | 7/2016 | Davidson et al. |
| 2009/0299000 | A1 | 12/2009 | Resendes et al. |
| 2011/0201742 | A1 | 8/2011 | Parent et al. |

OTHER PUBLICATIONS

Morton, Maurice, Rubber Technology (Third Edition), Chapter 10, Van Nostrand Reinhold Company, 1987, New York, pp. 297-300.
Parent, et al., "Ion-Dipole INteraction Effects in Isobutylene-based Ammonium Bromide Ionomers", Journal of Polymer Science: Part A: Polymer Chemistry, vol. 43, 2005, Wiley Periodicals, Inc., Hoboken, NJ, pp. 5671-5679.
Parent, et al., "Isobutylene-based ionomer composites: siliceous filler reinforcement", Polymer 45, 2004, Elsevier, Amsterdam, The Netherlands, pp. 8091-8096.
Parent, et al., "Synthesis and Characterization of Isobutylene-Based Ammonium and Phosphonium Bromide Ionomers", Macromolecules 2004, 37, American Chemical Society, Washington DC, pp. 7477-7483.
Encyclopedia of Polymer Science and Engineering, vol. 4, "Compounding", 1986, John Wiley & Sons, New York, NY, pp. 66-79.

*Primary Examiner* — Kelechi Egwim

(57) ABSTRACT

The present invention provides an optically transparent peroxide cured article made from a peroxide curable butyl rubber ionomer comprising repeating units derived from the reaction product of one or more multiolefin monomers and at least one nitrogen or phosphorous based nucleophile comprising a pendant vinyl group. A process is also disclosed for making the optically transparent article.

15 Claims, 15 Drawing Sheets

TRANSPARENT PEROXIDE CURABLE BUTYL RUBBER

FIELD OF THE INVENTION

The present invention relates to butyl rubber exhibiting optical transparency. More particularly, the invention relates to peroxide curable, especially peroxide curable, butyl rubber ionomers exhibiting optical transparency, especially peroxide curable butyl rubber ionomers comprising a pendant vinyl group, as well as processes for making the optically transparent ionomers and cured articles made from the ionomers.

BACKGROUND

Poly(isobutylene-co-isoprene), or IIR, is a synthetic elastomer commonly known as butyl rubber which has been prepared since the 1940's through the random cationic copolymerization of isobutylene with small amounts of isoprene (1-2 mole %). As a result of its molecular structure, IIR possesses superior air impermeability, a high loss modulus, oxidative stability and extended fatigue resistance.

Butyl rubber is understood to be a copolymer of an isoolefin and one or more, preferably conjugated, multiolefins as comonomers. Commercial butyl comprises a major portion of isoolefin and a minor amount, usually not more than 2.5 mol %, of a conjugated multiolefin. Butyl rubber or butyl polymer is generally prepared in a slurry process using methyl chloride as a diluent and a Friedel-Crafts catalyst as part of the polymerization initiator. This process is further described in U.S. Pat. No. 2,356,128 and Ullmanns Encyclopedia of Industrial Chemistry, volume A 23, 1993, pages 288-295.

Halogenation of this butyl rubber produces reactive allylic halide functionality within the elastomer. Conventional butyl rubber halogenation processes are described in, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company© 1987), particularly pp. 297-300.

The presence of allylic halide functionalities allows for nucleophilic alkylation reactions. It has been shown that treatment of brominated butyl rubber (BIIR) with nitrogen and/or phosphorus based nucleophiles, in the solid state, leads to the generation of IIR-based ionomers with interesting physical and chemical properties (see: Parent, J. S.; Liskova, A.; Whitney, R. A; Resendes, R. *Journal of Polymer Science, Part A*: Polymer Chemistry 43, 5671-5679, 2005; Parent, J. S.; Liskova, A.; Resendes, R. *Polymer* 45, 8091-8096, 2004; Parent, J. S.; Penciu, A.; Guillen-Castellanos, S. A.; Liskova, A.; Whitney, R. A. *Macromolecules* 37, 7477-7483, 2004). The ionomer functionality is generated from the reaction of a nitrogen or phosphorous based nucleophile and the allylic halide sites in the halogenated butyl rubber to produce an ammonium or phosphonium ionic group, respectively. The physical properties of these halogenated butyl rubber based ionomers, such as green strength, modulus, filler interactions etc., are superior to those of their non-ionomeric counterpart.

When butyl rubber is peroxide cured under conventional curing conditions, it typically exhibits a brownish colour and is not optically transparent. There are a number of applications in which it would be desired to have the physical properties of peroxide cured butyl rubber (e.g. impermeability to gases, flexibility and tensile strength) coupled with optical transparency. Therefore, there remains a need for an optically transparent peroxide curable butyl rubber.

SUMMARY OF THE INVENTION

According to an aspect of the present invention, there is provided a peroxide cured article made from a peroxide curable butyl rubber ionomer comprising: repeating units derived from at least one isoolefin monomer; and, repeating units derived from the reaction product, following halogenation, of one or more multiolefin monomers and at least one nitrogen or phosphorous based nucleophile comprising a pendant vinyl group, wherein at least a portion of the article having a thickness of less than or equal to 0.51 mm exhibits an optical transparency of at least 75% to a wavelength of 630 nm.

According to another aspect of the present invention, there is provided a process for producing a peroxide cured article made from a peroxide curable butyl rubber ionomer, wherein at least a portion of the article having a thickness of less than or equal to 0.51 mm exhibits an optical transparency of at least 75% to a wavelength of 630 nm, the process comprising: providing a halogenated butyl rubber polymer comprising repeating units derived from at least one isoolefin monomer and repeating units derived from one or more multiolefin monomers present in a total amount of from 0.5-2.5 mol %, the polymer comprising at least an allylic halogen moiety; admixing a nitrogen or phosphorous based nucleophile comprising a pendant vinyl group with the halogenated butyl rubber polymer; reacting the allylic halogen moiety with the nucleophile to form the peroxide curable butyl rubber ionomer; admixing a peroxide curing agent with the peroxide curable butyl rubber ionomer at a temperature of less than or equal to 60° C. for a time of between 4 minutes and 8 minutes; forming the peroxide curable butyl rubber ionomer admixed with the curing agent into an article between two heated surfaces having an RMS surface roughness of less than or equal to 10 nm; curing the article under suitable conditions for the peroxide curing agent; and, releasing the cured article from the heated surfaces while at a temperature of greater than 30° C. In an embodiment, the RMS surface roughness of the cured article is less than 7 nm.

Further aspects of the invention will be apparent to those of skilled in the art with reference to the following description.

BRIEF DESCRIPTION OF THE DRAWINGS

In order that the invention may be more clearly understood, preferred embodiments thereof will now be described with reference to the accompanying figures, in which.

DETAILED DESCRIPTION

Figure 1:
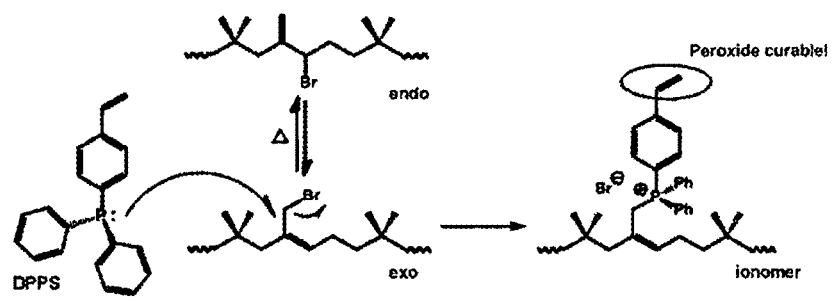
FIG. 1 is a reaction mechanism for the formation of BB2030™-DPPS butyl rubber.

The butyl rubber ionomer is prepared from a halogenated butyl rubber polymer. Butyl rubber polymers are generally derived from at least one isoolefin monomer, at least one multiolefin monomer and optionally further copolymerizable monomers.

In one embodiment, the ionomer may comprise repeating units derived from an isoolefin monomer and a conjugated diene monomer. In another embodiment, the butyl ionomer may comprise repeating units derived from an isoolefin monomer, a conjugated diene monomer and a styrenic monomer.

The butyl rubber polymer is not limited to a specific isoolefin. Any isoolefin, as known to those of skill in the art, are contemplated by the present invention including isoolefins having, for examples, within the range of from 4 to 16 carbon atoms. In one embodiment of the present invention, isoolefins having from 4-7 carbon atoms are contemplated. Examples of isoolefins for use in the present invention include isobutene, 2-methyl-1-butene, 3-methyl-1-butene, 2-methyl-2-butene, 4-methyl-1-pentene and mixtures. A preferred isoolefin is isobutene (isobutylene).

Similarly, the butyl rubber polymer is not limited to a specific multiolefin. Multiolefins copolymerizable with the isoolefins, as known to one skilled in the art, can be used in the practice of the present invention. Conjugated diene multiolefin monomers are preferred. Examples of such multiolefins include, for example, those having in the range of from 4-14 carbon atoms. Examples of suitable multiolefins include isoprene, butadiene, 2-methylbutadiene, 2,4-dimethylbutadiene, piperylene, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof. A preferred multiolefin comprises isoprene.

The butyl rubber useful in the present invention may include a co-monomer other than the above referenced multiolefins, such as an alkyl-substituted vinyl aromatic co-monomer, including but not limited to a $C_1$-$C_4$ alkyl substituted styrene. Specific examples of such co-monomers include, for example, α-methyl styrene, p-methyl styrene, chlorostyrene, cyclopentadiene and methylcyclopentadiene. In this embodiment of the present invention, the butyl rubber polymer may include, for example, random copolymers of isobutylene, isoprene and para-methylstyrene.

Once the butyl rubber polymer is formed from the monomer mixture, the butyl rubber polymer may be subjected to a halogenation process in order to form the halogenated butyl rubber polymer or halobutyl rubber polymer. Bromination or chlorination can be performed according to the process known by those skilled in the art, for example, the procedures described in Rubber Technology, 3rd Ed., Edited by Maurice Morton, Kluwer Academic Publishers, pp. 297-300 and further documents cited therein.

In one embodiment, a halogenated butyl rubber for use in the present invention includes a halogenated butyl rubber having isobutylene and less than 2.2 mol % isoprene, which is commercially available from LANXESS Deutschland GmbH and sold under the name BB2030™.

During halogenation, some or all of the multiolefin content of the butyl polymer is converted to allylic halides. The allylic halides in the halobutyl polymer are therefore repeating units derived from the multiolefin monomers originally present in the butyl polymer. The total allylic halide content of the halobutyl polymer cannot exceed the starting multiolefin content of the parent butyl polymer.

The allylic halide sites of the halobutyl polymer can then be reacted with at least one nitrogen or phosphorus containing nucleophile according to the following formula,

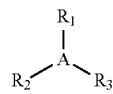

wherein:
A is nitrogen or phosphorus; and,
$R_1$, $R_2$ and $R_3$ are independently selected and comprise: linear or branched $C_1$-$C_{18}$ alkyl substituents; an aryl substituent which is monocyclic or composed of fused $C_4$-$C_8$ rings; or, combinations thereof, wherein at least one of $R_1$, $R_2$ or $R_3$ contains a pendant vinyl group.

In general, the appropriate nucleophile will contain at least one neutral phosphorus or nitrogen center which possesses a lone pair of electrons which is both electronically and sterically accessible for participation in nucleophilic substitution reactions. Suitable nucleophiles include but are not limited to diphenylphosphinostyrene (DPPS), allyldiphenylphosphine, diallylphenylphosphine, diphenylvinylphosphine, triallylphenylphosphine, N-vinyl caprolactam, N-vinyl phthalimide, 9-vinyl carbazole, N-[3-(dimethylamino)propyl]methacrylamide, diphenylvinylphsophin-methyl-N-vinylacetamide, N-allyl-N-butyl-2-propen-1-amine, 1-vinyl-2-pyrrolidone, 2-isopropenyl-2-oxazoline, 2-vinylpyrid-4-vinylpyridine, N-ethyl-2-vinylcarbazole or mixtures thereof.

A preferred nucleophile for use with the present invention is diphenylphosphinostyrene (DPPS), shown below.

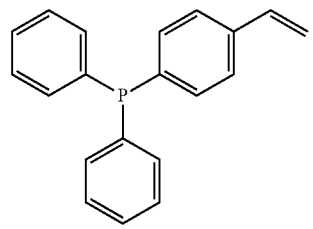 [SMILES: C=Cc1ccc(P(c2ccccc2)c2ccccc2)cc1]

When reacted with halogenated butyl rubber containing allylic halides produced at the multiolefin sites of the starting polymer, the reaction product produces a butyl rubber ionomer having unsaturation at the pendant vinyl sites. This unsaturation is in addition to any residual unsaturation remaining in the halogenated butyl rubber starting material. Unsaturation allows peroxide curability of the ionomer, without the molecular weight degradation and chain scission that normally occurs when insufficient olefinic bonds are present. The reaction process is pictured in FIG. 1.

The amount of nucleophile reacted with the butyl rubber may be in the range of from 0.05 to 5 molar equivalents, more preferably 0.5 to 4 molar equivalents and even more preferably 1 to 3 molar equivalents based on the total molar amount of allylic halide present in the halobutyl polymer.

The halobutyl polymer and the nucleophile can be reacted for about 0.25 to 90 minutes at a suitable temperature, for example at a temperature of from 80° C. to 100° C. When the reaction takes place in an internal mixer the reaction is preferably between 1 to 90 minutes, more preferably from 1 to 60 minutes.

Since the nucleophile reacts with the allylic halide functionality of the halobutyl polymer, the resulting ionomeric moiety is a repeating unit derived from an allylic halide. The total content of ionomeric moiety in the butyl ionomer therefore cannot exceed the starting amount of allylic halide in the halobutyl polymer; however, residual allylic halides and/or residual multiolefins may be present. The resulting halobutyl based ionomer preferably possesses at least 0.05 mol %, preferably at least 0.75 mol %, more preferably at least 1.0 mol % of the ionomeric moiety up to an amount not exceeding the original allylic halide content of the halobutyl polymer used to produce the butyl ionomer. Residual allylic halides may be present in a non-zero amount up to an amount not exceeding the original allylic halide content of the halobutyl polymer used to produce the butyl ionomer. Residual multiolefin may be present in a non-zero amount up to an amount not exceeding the original multiolefin content of the butyl polymer used to produce the halobutyl polymer.

Figure 2:
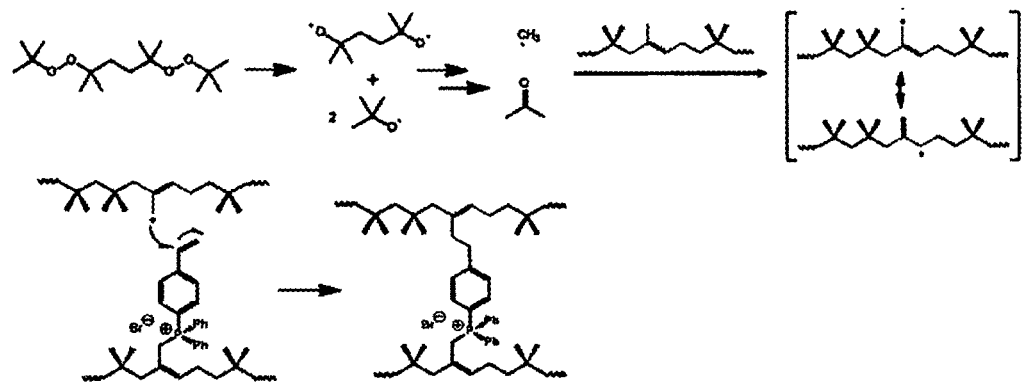
FIG. 2 is a reaction mechanism for peroxide cure of BB2030™-DPPS butyl rubber.

The presence of the pendant vinyl group makes compounds according to the present invention suitable for peroxide curing, despite the lack of high levels of residual multiolefin content previously thought necessary to allow peroxide curing without undue chain scission and molecular weight degradation. A schematic of the peroxide curing of compounds of the present invention is provided in FIG. 2.

Peroxide based curing systems suitable for use in the present invention may comprise a peroxide curing agent, for example, dicumyl peroxide, di-tert-butyl peroxide, benzoyl peroxide, 2,2'-bis (tert.-butylperoxy) diisopropylbenzene (Vulcup® 40KE), benzoyl peroxide, 2,5-dimethyl-2,5-di (tert-butylperoxy)-hexyne-3, 2,5-dimethyl-2,5-di(benzolyperoxy)hexane, (2,5-bis(tert.-butylperoxy)-2,5-dimethyl hexane and the like. One such peroxide curing agent comprises dicumyl peroxide and is commercially available under the name DiCup 40C™. Another peroxide curing agent is 2,5-bis(tert.-butylperoxy)-2,5-dimethyl hexane commercially available under the name Trigonox 101-45B-PD-AM. In one embodiment, the peroxide curing agent is used in an amount of 0.1 to 7 parts per hundred parts of rubber (phr). In another embodiment, the peroxide curing agent is used in an amount of 0.3 to 6 phr. In yet another embodiment, the peroxide curing agent is used in an amount of about 4 phr.

Peroxide curing co-agents can also be used in the present invention. Suitable peroxide curing co-agents include, for example, triallyl isocyanurate (TAIC), commercially available under the name DIAK 7™ from DuPont, N,N'-m-phenylene dimaleimide, known as HVA-2™ (DuPont Dow), triallyl cyanurate (TAC) or liquid polybutadiene known as Ricon D 153™ (supplied by Ricon Resins). Peroxide curing co-agents may be used in amounts equivalent to those of the peroxide curing agent, or less.

Curing of the article can be effected by providing conditions suitable for curing the peroxide curing agent, for example an elevated temperature in the range of from 80 to 250° C., preferably 100 to 200° C., more preferably 120 to 170° C.

In some embodiments, in order to preserve optical transparency, it is desirable that no fillers are employed in the compounds of the present invention. These filler free compounds must therefore possess the necessary physical properties when cured, without the benefit of filler re-enforcement. However, in other embodiments, it is possible to employ certain optically transparent fillers to enhance the physical properties of the final cured compounds. Examples of suitable optically transparent fillers that may be used include Aerosil® transparent fumed silica and similar products available under alternative tradenames.

The state of peroxide cured articles is enhanced with butyl polymers containing increased levels of unsaturation. This can be achieved with polymers having elevated levels of multiolefin content in the polymer backbone or through addition of increased unsaturation attributable to the pendant vinyl groups of the phosphorous or nitrogen based nucleophile. Total unsaturation levels exceeding 0.5 mol %, preferably greater than 1.0 mol % lead to desirably enhanced cure states. By using as starting materials butyl rubber polymers with elevated levels of isoprene, for example in excess of 3.5 mol %, in the polymer backbone, enhanced cure states can be achieved. A preferred peroxide cured butyl rubber compound comprises a cure state MH greater than 4.5 dNm, greater than 7.5 dNm, greater than 10 dNm greater than 12 dNm, or greater than 12.5 dNm.

Compounds according to the present invention desirably exhibit enhanced physical strength in the unfilled state. In one embodiment, compounds of the present invention have a modulus at 200% elongation of greater than 0.52 MPa, greater than 1.3 MPa, greater than 2 MPa, or greater than or equal to 2.9 MPa.

It is desirable that the cured articles according to the present invention retain the desirable impermeability to gases exhibited by butyl rubber. Cured articles according to the present invention desirably exhibit an impermeability to oxygen in the range of from 170-325 cc-mm/(m$^2$-day), from 170-240 cc-mm/(m$^2$-day), from 200-240 cc-mm/(m$^2$-day), or from 212-220 cc-mm/(m$^2$-day).

It is desirable that the cured articles according to the invention are optically transparent. This may be characterized as a transmittance of greater than or equal to 75% of visible light of a wavelength selected from 350 to 750 nm at a thickness of 0.51 mm or less. For example, cured articles of the present invention may exhibit an optical transparency of greater than or equal to 75% at a thickness of 0.51 mm for a wavelength of 630 nm, preferably greater than or equal to 80%, more preferably greater than or equal to 83% or within the range of from 83% to 99.9%, 83% to 99%, 83 to 95% or 83 to 92%. Persons of skill in the art may readily convert these ranges of transmittance values to absorption co-efficients using Beer's law and a thickness of 0.51 mm.

It is also desirable that the articles according to the present invention exhibit low surface tackiness in order to enable them to be handled, processed and ultimately used in a variety of applications.

A combination of some or all of the foregoing physical, rheological, permeability, transparency and tackiness properties is desirable to form a cured article useful in a variety of applications.

In some embodiments of the present invention, stabilizers, anti-oxidants, tackifiers, and/or other additives as known to those of skill in the art may also be added. However, it is important that these additives are chosen and/or added in an amount consistent with preserving the optical transparency of the material.

In embodiments where the composition includes the ionomer, curing agents, and/or other additives, the ingredients may be compounded together by mixing the ingredients of the composite together using, for example, an internal mixer, such as a Banbury mixer, a miniature internal mixer, such as a Haake or Brabender mixer, or a two roll mill mixer. An extruder also provides good mixing, and permits shorter mixing times. It is possible to carry out the mixing in two or more stages, and the mixing can be done in different apparatus, for example one stage in an internal mixer and one stage in an extruder.

Although a variety of mixing temperatures (either due to applied heat or created by shear during the mixing process) can be used, in one embodiment the mixing temperature is controlled in order to keep it below the temperature at which significant ionomer formation occurs. Ionomer formation has been shown to be detrimental to the overall optical transparency of the polymer. Suitable mixing temperatures are less than 100° C., for example from 25 to 100° C., 25 to 80° C., or 25 to 60° C. Temperature may be controlled by adjusting the mixing rate, thereby creating less heat induced shear, selecting an appropriate polymer Mooney viscosity (for example, from 20,000 to 65,000 Mooney units), applying cooling to the polymer during mixing, or other suitable techniques.

For further information on compounding techniques, see Encyclopedia of Polymer Science and Engineering, Vol. 4, p. 66 et seq. (Compounding). Other techniques, as known to those of skill in the art, are further suitable for compounding.

Additionally, fillers, curing agents, and/or other additives may be added to the ionomer. To maintain optical transparency, white or transparent fillers are often used. An example of a suitable white filler is Aerosil™, a silica based filler. The amount of filler used and the type of filler used may be selected according to the desired optical transparency.

Peroxide cured articles may be made from the compounds of the present invention in the form of coatings or encapsulants for opto-electronic devices, such as LED's, fiber optics, opto-electronic couplers, etc.

It is desirable that the polymer exhibits total unsaturation of the butyl rubber and the pendant vinyl group in a total amount greater than or equal to 1.0 mol % prior to curing, in order to ensure sufficient unsaturation is present to allow peroxide cure to take place. In one embodiment of the process for producing peroxide cured articles, it is desirable to first admix the nucleophile comprising a pendant vinyl group with the halogenated butyl rubber to form the ionomer, then to peroxide cure the ionomer by admixing it with a peroxide curing agent. This method often produces rubber with an elevated state of cure, but at the expense of reduced optical transparency due to a "nervy" texture generated from ionomer formation. In other embodiments, it is desirable to form peroxide cured compounds by admixing the halogenated butyl rubber with both the nucleophile comprising the pendant vinyl group and the peroxide curing agent, to thereby form the ionomer in situ during curing of the compound. This process is simpler from a process point of view, in that it requires only a single step to lead to enhanced states of peroxide cure of halogenated butyl rubber grades with insufficient diene levels in the backbone to otherwise permit peroxide curability. However, the in situ process can also be used with halogenated butyl rubber grades having elevated levels of isoprene in the backbone (for example, greater than 2.5 mol %, greater than 3.5 mol % isoprene, from 2.5 to 7.0 mol % isoprene or from 3.5 to 7.5 mol % isoprene), in order to produce cured compounds having desirably elevated cure states and short cure times. Cured compounds produced in situ desirably have at least comparable cure states, and may have enhanced cure states, as compared with compounds produced in a multi-step process. They also exhibit decreased optical transparency due to the resulting "nervy" texture.

It is desirable that the cured articles according to the present invention have a low surface roughness in order to increase optical transparency. The root mean squared (RMS) surface roughness of the cured articles of the present invention may be in the range of from 0.1-100 nm, preferably 0.1-50 nm, more preferably 0.1-10 nm. An RMS surface roughness in the range of 0.1-10 nm may be characterized as an ultra-smooth surface.

In order to obtain an ultra-smooth surface, molding surfaces of the present invention may be coated with a release layer comprising, for example: poly(dimethyl)siloxane, (PDMS); silicone rubber polymer, such as Ecoflex™; a fluoropolymer, such as polytetrafluoroethylene (PTFE, commonly available under the trade name Teflon®), or other suitable polymers exhibiting heat resistance to the molding and/or curing temperature and release properties after curing. PDMS is electrically non-conductive and optically transparent, although it exhibits poor impermeability to gases, which can lead to oxidation of encapsulated electronics or coated electrodes. The coating may be applied to a mold surface by a variety of known techniques, such as spin coating. Surfaces may also be coated with Teflon® to obtain a less smooth surface that is still adequate for some embodiments of the invention. A combination of Teflon® and PDMS may also be applied so that the PDMS layer can be more readily removed from the mold surface. This can advantageously allow for recycling of the PDMS in certain applications. In one embodiment, the mold surfaces further comprise silicon wafers as a substrate for the coatings. In some embodiments, the mold surfaces are heated or cooled to a temperature of less than 100° C., greater than 30° C., from 30 to 100° C., or from 30 to 60° C. prior to release of the article from the mold to facilitate release.

The mold may be heated to effect curing of the mixed compound. For example, the mold may be heated to a temperature of from 100 to 200° C., from 130 to 200° C., 130 to 180° C., from 160 to 175° C., or about 175° C. The molding process may take place from 1 to 30 minutes, from 4 to 30 minutes, or from 4 to 8 minutes. It is desirable that the molding process not be conducted for an overly long period of time to avoid scorching the ionomer, thereby decreasing its optical transparency.

Highly transparent butyl rubber cured articles are useful in a number of application areas, such as stretchable/flexible electronics, solar cells, encapsulated materials and thin films.

EXAMPLES

Materials

Bromobutyl 2030 (a halogenated butyl rubber polymer having 0.8-1.5 mol % isoprene) is a product of LANXESS Inc. The remaining materials were used as received: p-styryldiphenylphosphine (DPPS) (Hokko Chemical Industry), Trigonox 101-45B-PD-AM (peroxide) (Akzo Nobel); poly(dimethylsiloxane) Sylgard-184 (PDMS) (Aldrich) and, 3" Silicon wafers (University Wafer).

Mixing Procedure:

The polymer was added to a Brabender internal mixer equipped with high shear (roller) blades at 60° C. and 60 rpm. The rubber was masticated alone for 60 seconds followed by addition of DPPS. The peroxide was added after 4 minutes of mixing and mixture dumped after 6 minutes. Once all the ingredients were incorporated, the compound was refined with 6×¾ inch cuts and 6 endwise passes. This formulation was used for all further experiments and is described in Table 1.

TABLE 1

| Formulation of BB2030 ™-DPPS butyl rubber ionomer. | |
|---|---|
| Ingredient (PHR) | 12YR053 |
| BB2030 ™ | 100 |
| DPPS | 5 |
| Trigonox 101-45B-PD-AM | 0.3 |

The t90 and delta torques were determined according to ASTM D-5289 with the use of a Moving Die Rheometer (MDR 2000E) using a frequency of oscillation of 1.7 Hz and a 1° arc at 175° C. for 30 minutes total run time. The rheological results are tabulated in Table 2.

TABLE 2

| Rheological testing results from peroxide cure of BB2030 ™-DPPS butyl rubber ionomer using MDR (1 degree arc, 1.7 Hz, 175° C., 30 min) | |
|---|---|
| MDR results | 12YR053 |
| MH (dNm) | 13.3 |
| ML (dNm) | 1.3 |
| MH − ML (dNm) | 11.9 |
| ts2 (min) | 1.1 |
| t90 (min) | 7.9 |

Example 1: Preparation of Ultra-Smooth Transparent BB2030™-DPPS Butyl Rubber Ionomer Sheets Ultra-smooth BB2030™-DPPS butyl rubber ionomer substrates were prepared by molding freshly milled ionomer between two silicon wafers coated with poly(dimethylsiloxane) (PDMS), which acted as an easy release layer.

The silicon wafers (3" diameter) were first cleaned in Piranha solution (a 7:3 (v/v) mixture of 98% $H_2SO_4$ and 30% $H_2O_2$) for 5 min, followed by rinsing in deionized water and drying on a 120° C. hotplate. Sylgard-184 PDMS prepolymer was then spin-coated on the wafer surface at 3000 RPM for 50 s. The PDMS coating was cured in a oven at 60° C. overnight.

Figure 3:
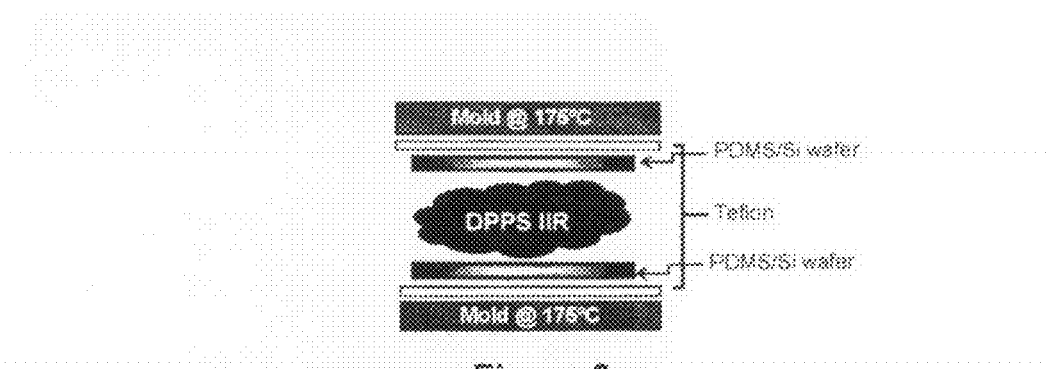
FIG. 3 is a schematic of sample preparation for cure of BB2030™-DPPS butyl rubber sheets against PDMS coated wafer between sheets of Teflon® at 175° C. for 8 minutes.

Ultra-smooth BB2030™-DPPS ionomer substrates were prepared by molding the BB2030™-DPPS ionomer formulation between two PDMS-coated silicon wafers: 10 g of freshly compounded BB2030™-DPPS was placed in a ½ macro mold with 2 mm thickness between the two PDMS-coated silicon wafers and one Teflon® sheet (0.26 mm thick) on either side of the wafers. The mold was placed in a manual carver press (model 3853-0) equipped with a temperature control with platens temperature set to 175° C., under 20 tons of pressure. This was cured at 175° C. for 8 min. (FIG. 3). The wafers were removed from the rubber sheets while still hot providing ultra-smooth rubber sheets (~0.4 mm thick).

Example 2: Atomic Force Microscopy (AFM) Measurements of Surface Roughness

AFM images were used to quantify the RMS surface roughness (Table 3). RMS (root mean square) is the term used to measure the roughness of a surface. AFM images were taken of BB2030™-DPPS butyl rubber sheets cured via two methods: the first was freshly milled BB2030™-DPPS butyl rubber cured against Teflon® sheets on either side; and, the second was cured directly against PDMS coated Si wafers on both sides.

TABLE 3

RMS surface roughness for BB2030 ™-DPPS butyl rubber pressed between Teflon ® (1) and pressed between PDMS coated Si wafers (2).

| Cure Method | RMS Roughness (nm) |
|---|---|
| 1 | 167.47 ± 2.93 |
| 2 | 6.59 ± 0.51 |

Example 3: UV-Vis Spectroscopy to Determine Optical Transmittance

The transmission spectra for PDMS and BB2030™-DPPS butyl rubber ionomer thin film sheets were obtained using a Varian Cary 50 UV-Vis spectrometer scanned from 200-800 nm. Each sample was placed on a glass slide and the transmission spectra obtained. The glass slide was subtracted as the baseline. Results are reported in FIG. 10.

Example 4: Physical Testing

Stress strain dumbbells were cured at 175° C. for t90+5 minutes. Stress/strain properties were tested using the T2000 tensile tester. The ASTM D412 procedure was followed to test samples that were unaged and the median of 3 values was taken as the result. Hardness was tested using the Shore A Hardness Tester according to ASTM D2240. Three cured dumbbells (to be used for tensile testing) were stacked on each other to make the sample the proper height. The median of 5 values was taken as the result. Results are reported in Table 4.

TABLE 4

Physical testing results from peroxide cured BB2030 ™-DPPS butyl rubber ionomer at 175° C. for t90 + 5 min.

| Physical property | 12YR053 |
|---|---|
| $t_{cure}$ (min) | 8 |
| Hardness (ShoreA) | 40 |
| Tensile strength (MPa) | 3.51 |
| Ultimate elongation (%) | 170 |
| Modulus @ 25% (MPa) | 0.41 |
| Modulus @ 50% (MPa) | 0.64 |
| Modulus @ 100% (MPa) | 1.17 |

Example 5: Permeability Measurements

Permeability of the surface-modified butyl rubber samples to oxygen was quantified using a Mocon Ox-Tran Model 2/61 permeation test system. The thickness of the samples was first measured at five points. Samples were discarded if thickness differences between any of these five points differed by >25%. The samples were preconditioned with oxygen for 10 hours in the instrument prior to permeation measurements. Oxygen permeation was measured at 40° C. and 0% relative humidity over 3 to 5 twenty min. cycles to determine the oxygen transmission rate (in cc/[$m^2$·day]) through the sample and the permeation rate (in cc·mm/[$m^2$·day]). A minimum of three samples of each type were measured. Results are reported in Table 5. PDMS was also tested, but permeation rates were too high to provide measurable results.

TABLE 5

Oxygen permeation rate for BB2030 ™-DPPS butyl rubber ionomer.

| Material | Permeation rate (cc-mm/(m2-day) |
|---|---|
| 12YR053 | 216.38 ± 3.57† |

†Average of three samples

Example 6: Curing Against Alternative Substrates

Figure 12:
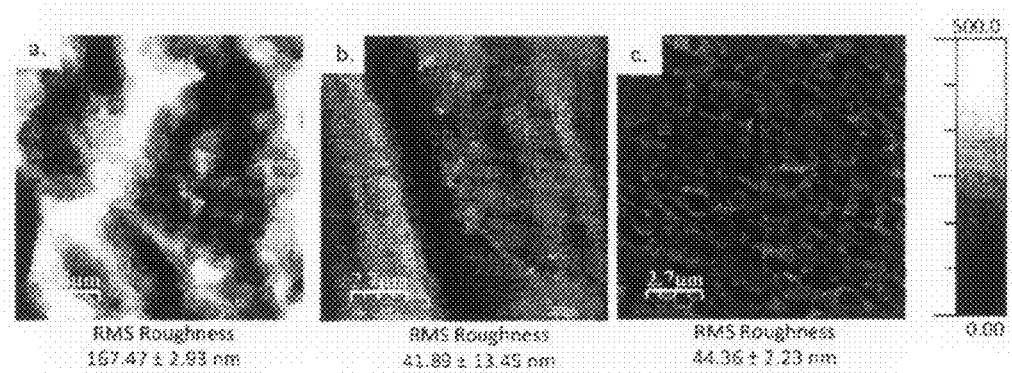
FIG. 12 shows AFM images of DPPS-BB2030™ sheets cured against a) Teflon® sheets, (b) polished aluminum sheets and (c) glass slide, with RMS roughness for each sheet listed below the AFM image.
Figure 13:
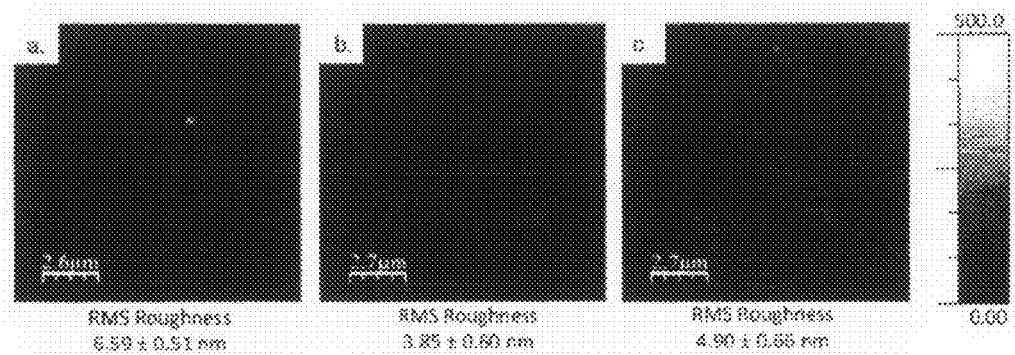
FIG. 13 shows AFM images of DPPS-BB2030™ cured against a) PDMS coated 3" Si wafers, (b) PDMS coated polished aluminum sheets and (c) PDMS coated glass slide, with RMS roughness for each sheet listed below the AFM image.
Figure 14:
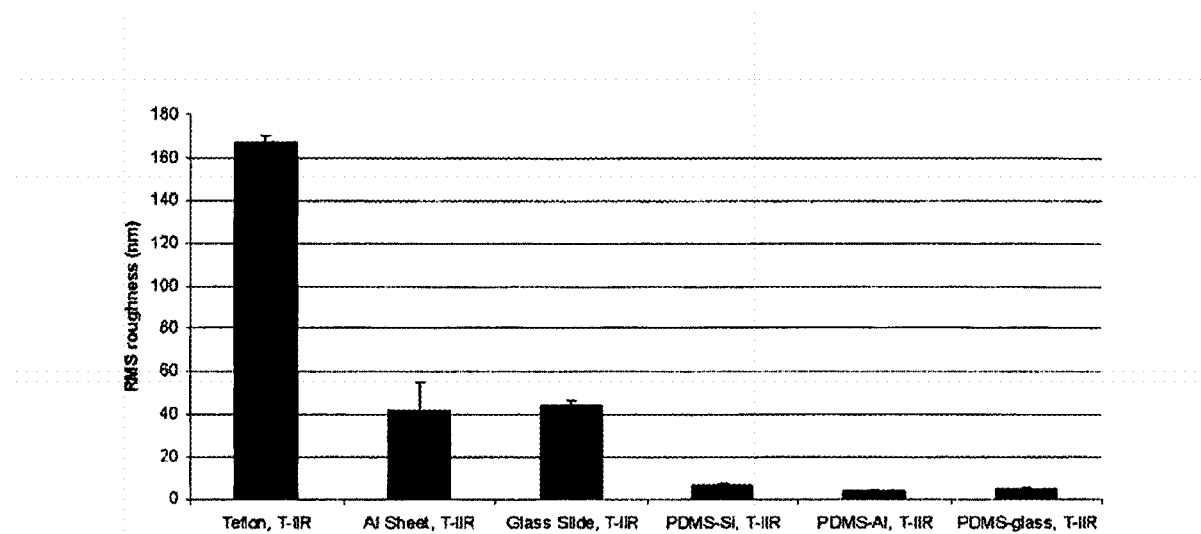
FIG. 14 shows RMS roughness measured via AFM imaging for DPPS-BB2030™ IIR cured against various PDMS coated and non-coated substrates.

To confirm that curing butyl rubber against PDMS results in IIR with low surface roughness and increased optical transparency DPPS-BB2030™ was cured against alternative substrates with and without PDMS coating. The alternative substrates chosen were Teflon® sheets, polished aluminum sheets and glass slides. FIG. 12 shows AFM images obtained from DPPS-BB2030™ sheets cured against Teflon sheets (FIG. 12*a*), polished aluminum sheets (FIG. 12*b*) and glass slides (FIG. 12*c*). The RMS surface roughness measured via AFM imaging is plotted in FIG. 14. The surface roughness was highest when curing against Teflon sheets with RMS roughness of 167.47 nm. The surface roughness was lower when curing against polished aluminum sheets with RMS roughness of 41.89 nm, however not as smooth as curing against PDMS coated Si wafers with RMS roughness of 6.59 nm. A surface roughness of 44.36 nm was obtained when curing against glass slides but the surface showed porous surface morphology. The various substrates (Si wafer, aluminum, glass) were then coated with PDMS and DPPS-BB2030™ was cured against these coated substrates. All three coated substrates produced cured DPPS-BB2030™ rubber with low surface roughness; 6.59 nm when cured against PDMS-Si wafer, 3.85 nm when cured against PDMS-aluminum sheet and 4.90 nm when cured against PDMS-glass slide (FIG. 13). These results confirm that PDMS acts as a smooth release layer giving cured butyl sheets with low surface roughness.

Example 7: Transmittance Measurements

Figure 15:
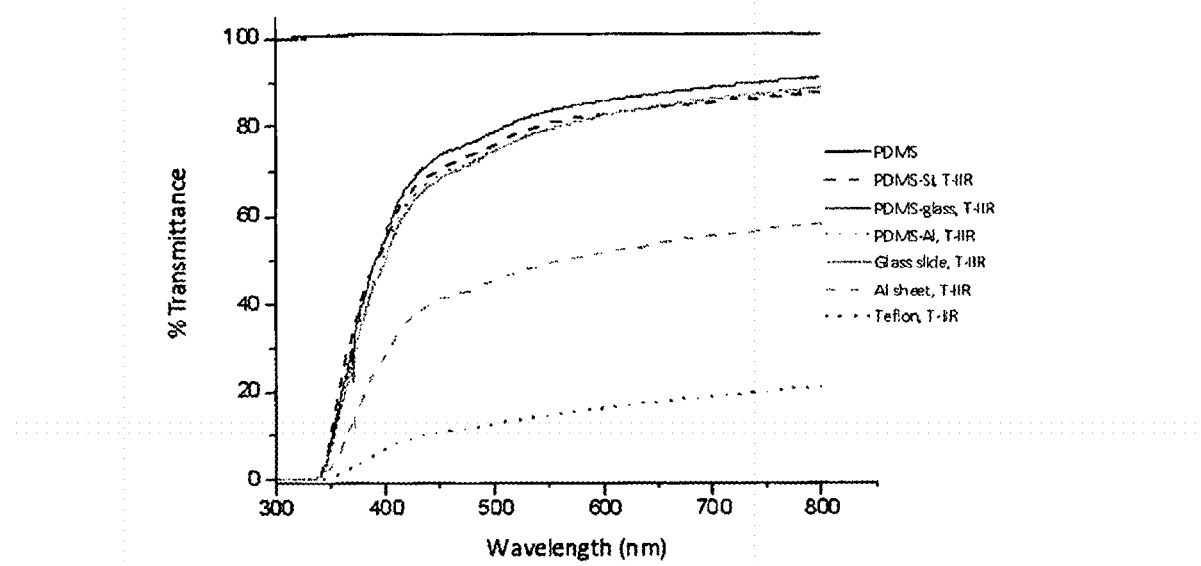
FIG. 15 shows transmission spectra of DPPS-BB2030™ of thickness ~0.5 mm cured against various substrates with cured PDMS as the control (100% optically transparent).

The transmission spectra were obtained for DPPS-BB2030™ cured against the various uncoated and PDMS coated substrates to correlate increased optical transparency with low surface roughness (FIG. 15). The optical transparency (@630 nm) for DPPS-BB2030™ cured against all uncoated and PDMS coated substrates is listed in Table 7. The optical transparency was the lowest for DPPSBB2030™ cured against Teflon® sheets, having the highest surface roughness, with 17% transparency at 630 nm. The surface roughness was somewhat lower when curing DPPS-BB2030™ against polished aluminum sheets resulting in 53% transparency at 630 nm. All substrates coated with PDMS, having the lowest surface roughness, resulted in high optical transparency ranging between 84 and 87% transparency at 630 nm. The trend confirms that high surface roughness results in low optical transparency and when the surface roughness is decreased the optical transparency increases.

TABLE 7

Optical transparency of DPPS-BB2030 ™ IIR sheets (~0.5 mm thick) based on curing against various uncoated and PDMS coated substrates at 175° C. for 9 min.

| Cure substrate | Optical transparency (@ 630 nm) |
| --- | --- |
| PDMS-Si wafer | 84% |
| PDMS-glass slide | 87% |
| PDMS-Al sheet | 84% |
| Glass slide | 84% |
| Al sheet | 53% |
| Teflon | 17.0% |

Example 8: Additional Butyl Grades

Other unfilled butyl rubber formulations were investigated, such as peroxide cured BB2030™ (without DPPS ionomer) and peroxide cured butyl rubber comprising 6.9 mol % isoprene (internally designated as RB70, but not sold commercially). The various peroxide cured unfilled butyl rubber formulations are listed in Table 8. Rheological testing results are listed in Table 9 and physical testing results are listed in Table 10. The oxygen permeation rates are listed in Table 11.

TABLE 8

Peroxide cured unfilled butyl rubber formulations.

| Ingredient (PHR) | 12YR110 (DPPS-BB2030 ™) | 12YR114 (BB2030 ™) | 12YR115 (RB70) |
| --- | --- | --- | --- |
| BB2030 ™ | 100 | 100 | — |
| RB70 | — | — | 100 |

TABLE 8-continued

Peroxide cured unfilled butyl rubber formulations.

| Ingredient (PHR) | 12YR110 (DPPS-BB2030 ™) | 12YR114 (BB2030 ™) | 12YR115 (RB70) |
| --- | --- | --- | --- |
| HVA-2 | — | 1.75 | 1.50 |
| DPPS | 5 | — | — |
| Maglite D | — | 1.00 | — |
| Di-Cup 40C | — | 2.50 | — |
| Trigonox 101-45B-PD-AM | 0.3 | — | 0.3 |

TABLE 9

Rheological testing results from peroxide cured unfilled IIR formulations (BB2030 ™, DPPS-BB2030 ™ and RB70) using MDR (1 degree arc, 1.7 Hz, 175° C., 30 min).

| MDR results | 12YR110 (DPPS-BB2030 ™) | 12YR114 (BB2030 ™) | 12YR115 (RB70) |
| --- | --- | --- | --- |
| MH (dNm) | 12.8 | 7.5 | 4.5 |
| ML (dNm) | 1.4 | 2.1 | 1.2 |
| MH-ML (dNm) | 11.3 | 5.5 | 3.3 |
| ts2 (min) | 1.3 | 1.0 | 5.2 |
| t90 (min) | 7.9 | 1.8 | 8.6 |

TABLE 10

Physical testing results from peroxide cured BB2030 ™-DPPS butyl rubber at 175° C. for t90 + 5 min.

| Physical property | 12YR110 (DPPS-BB2030 ™) | 12YR114 (BB2030 ™) | 12YR115 (RB70) |
| --- | --- | --- | --- |
| tcure (min) | 8.0 | 7.0 | 14.0 |
| Hardness (ShoreA) | 40 | 31 | 25 |
| Tensile strength (MPa) | 3.51 | 1.62 | 2.56 |
| Ultimate elongation (%) | 170 | 230 | 514 |
| Modulus @ 25% (MPa) | 0.41 | 0.265 | 0.21 |
| Modulus @ 50% (MPa) | 0.64 | 0.392 | 0.30 |
| Modulus @ 100% (MPa) | 1.17 | 0.606 | 0.38 |
| Modulus @ 200% (MPa) | 2.9 | 1.3 | 0.52 |
| Elongation set (% set) | 101 | 100 | 101 |

TABLE 11

Oxygen permeation rate for BB2030 ™-DPPS butyl rubber.

| Material | Permeation rate (cc-mm/(m2-day) |
| --- | --- |
| 12YR110 (DPPS-BB2030 ™) | 216 ± 4† |
| 12YR114 (BB2030 ™) | 274 ± 16† |
| 12YR115 (RB70) | 285 ± 40† |
| BB2030 ™ (Inner liner) | 169 |

†Average of three samples

Example 9: Additional Butyl Grades—Transparency

Figure 16:
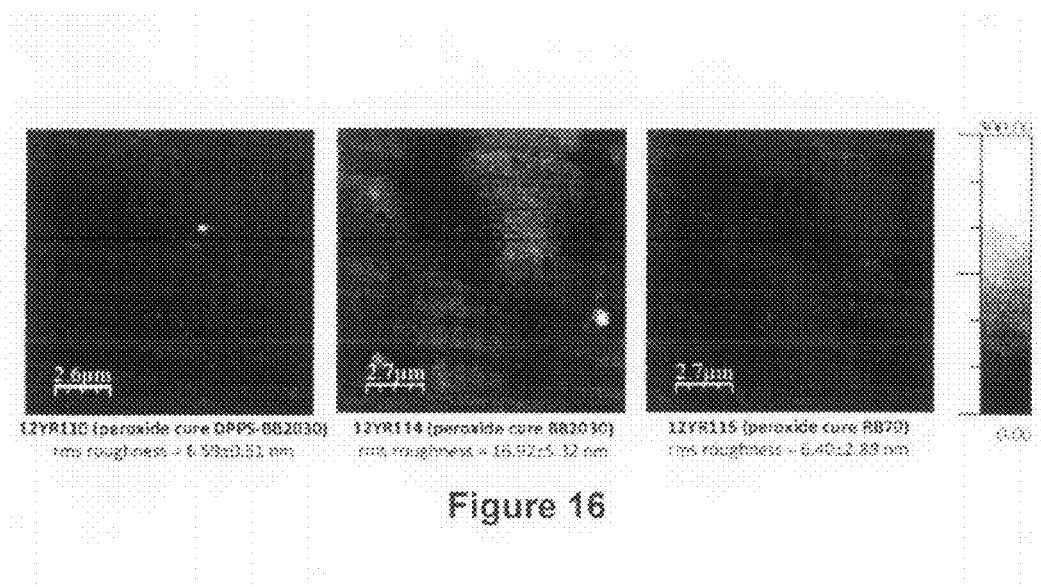
FIG. 16 shows AFM images of unfilled IIR cured against PDMS coated 3" Si wafers at 175° C. for 9 min: (a) DPPS-BB2030™, (b) peroxide cured BB2030™ and (c) peroxide cured butyl rubber comprising 6.9 mol % isoprene (RB70)
Figure 17:
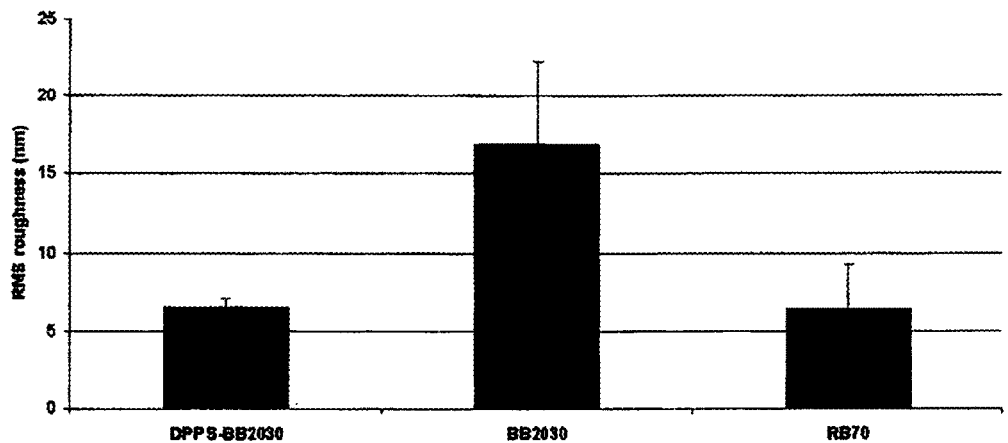
FIG. 17 shows RMS roughness measured via AFM imaging for unfilled-IIR sheets cured against PDMS coated Si wafers; and, FIG. 18 shows transmission spectra of various unfilled IIR sheets (~1.0 mm thick) cured against PDMS coated 3" Si wafers at 175° C. for 9 min.

Both peroxide cured BB2030™ and peroxide cured butyl rubber comprising 6.9 mol % isoprene (RB70) were cured against PDMS coated Si wafers; surface roughness was measured via AFM imaging and optical transparency measured via UV-Vis spectroscopy. The peroxide cured BB2030™ was opaque and the peroxide cured RB70 was optically transparent. The surface roughness of the peroxide cured BB2030™ was 16.93 nm and the peroxide cured RB70 was 6.4 nm. The AFM images for all three unfilled formulations are shown in FIG. 16 and the RMS surface roughness measured via AFM imaging is plotted in FIG. 17. These results confirm that PDMS acts as the smooth easy release layer giving cured butyl sheets with high optical transparency and low surface roughness for at least the RB70 and 662030™-DPPS unfilled butyl formulations.

Figure 18:
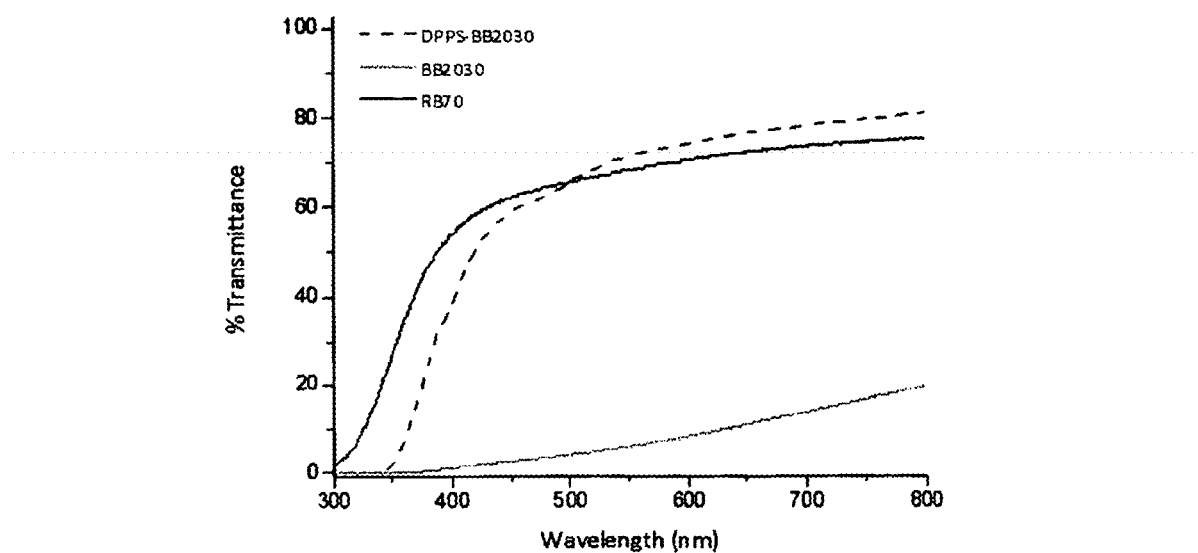

The transmission spectra for all three unfilled butyl rubbers cured against PDMS coated Si wafers are shown in FIG. 18. DPPS-BB2030™ had the highest optical transparency with 75% optical transparency, followed by RB70 with 72% optical transparency and BB2030™ having the lowest optical transparency of 10% at 630 nm (Table 12). The optical transparency is thickness dependent and these percentages are ~10% lower than those previously mentioned due to an increase in thickness of the butyl sheet (from 0.5 mm to 1.0 mm).

TABLE 12

Optical transparency of various peroxide cured unfilled IIR sheets (~1.5 mm thick) based on curing against PDMS coated Si wafers at 175° C. for 9 min.

| IIR | Optical transparency (@ 630 nm) |
| --- | --- |
| BB2030 ™ | 10% |
| DPPS-BB2030 ™ | 76% |
| RB70 | 72% |

Results and Discussion

Cured articles made from BB2030™-DPPS butyl rubber ionomer using the above compounding and curing process were highly transparent and ultra-smooth with low surface roughness. Initially, highly transparent ultra-smooth BB2030™-DPPS ionomer sheets could only be obtained by milling all ingredients on a mill with high shear for excessive periods of time. Small ripples throughout the cured butyl sheets were observed with less than 15 passes through the mill. These ripples, observed throughout the cured sheet, decrease the transparency. Although these samples were transparent enough for some applications, to improve transparency the BB2030™-DPPS samples were excessively milled (more than 15 passes) before curing the sheets.

Figure 4:
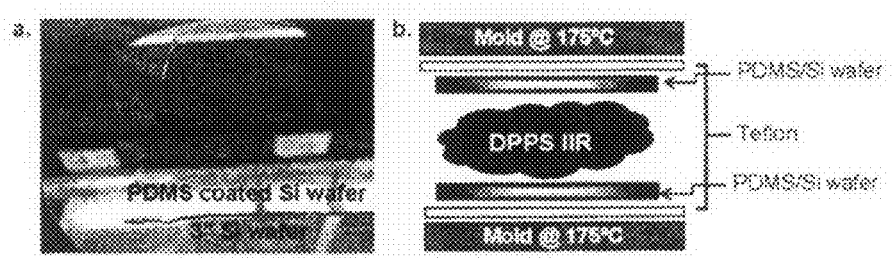
FIG. 4a is an uncoated Si wafer and PDMS coated Si wafer (right)
FIG. 4b is a schematic showing sample preparation for cure of BB2030™-DPPS butyl rubber ionomer sheets against PDMS coated wafer between sheets of Teflon® at 175° C. for 8 minutes.

The process to obtain higher transparency and an ultra-smooth surface entailed curing freshly milled BB2030™-DPPS butyl against Silicon (Si) wafers which were pre-coated with PDMS. PDMS was spin-coated and cured on the Si wafer. PDMS acts as an ultra-smooth easy release layer when butyl is cured directly against it. A picture comparing an uncoated and a PDMS coated Si wafer is shown in FIG. 4a. The schematic for sample preparation for curing butyl sheets against PDMS coated wafer is also shown in FIG. 4b. Teflon sheets were inserted into the mold to give the desired thickness of the butyl sheet. Each butyl sheet was cured for 8 minutes at 175° C. on a manual carver with 35000 pounds of pressure. Lower pressure was used initially to avoid shattering of the Si wafers.

Figure 5:
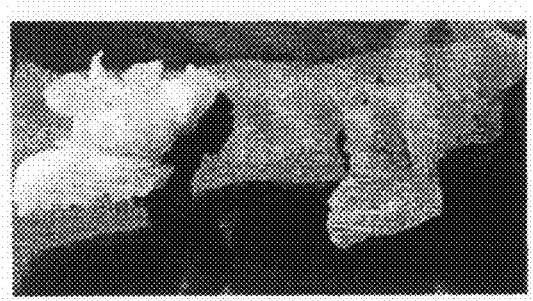
FIG. 5 is a BB2030™-DPPS butyl rubber after mixing in Brabender at 60° C. (left) and after mixing in Brabender followed by milling (right)
Figure 6:
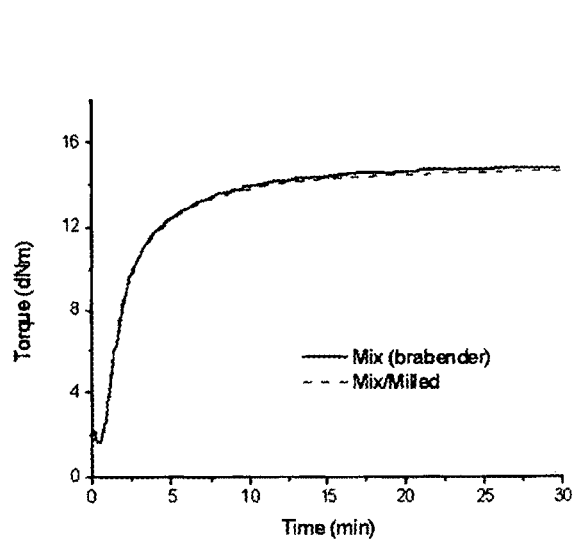
FIG. 6 is a plot of MDR (using frequency oscillation of 1.7 Hz and 1° Arc) of BB2030™-DPPS butyl rubber ionomer at 175° C. for 30 minutes after mixing in Brabender at 60° C. (black) and after mixing in Brabender followed by milling (grey; dash)

The process to fabricate highly transparent and ultra-smooth BB2030™-DPPS butyl rubber sheets has been significantly simplified to be applicable to industry standards. Previous attempts to mix DPPS in a Brabender at elevated temperatures were unsuccessful due to cross-linking in the mixer. However, mixing all ingredients in a Brabender with high shear blades at a lower temperature of 60° C. for 6 minutes resulted in a material that was white in colour (see FIG. 5, left). After refining with 6×¾" cuts on the mill and 3 endwise passes the material had become translucent (see FIG. 5, right). MDR curves were obtained for the sample before and after milling at 175° C. for 30 minutes to confirm that there were no changes in the rate of cure between the two materials. As observed in the MDR plot (FIG. 6) there was no visible change in the rate of cure between the solely mixed and the mixed/milled samples.

Cured sheets for both the excessively milled BB2030™-DPPS rubber and the freshly mixed/milled samples were compared to determine if there were any observable changes in the transparency of the rubber sheets. Both samples were cured under the same process mentioned above for 8 minutes at 175° C. Both samples yielded highly transparent and ultra-smooth BB2030™-DPPS butyl rubber sheets with no observable difference between the two sheets.

Figure 7:
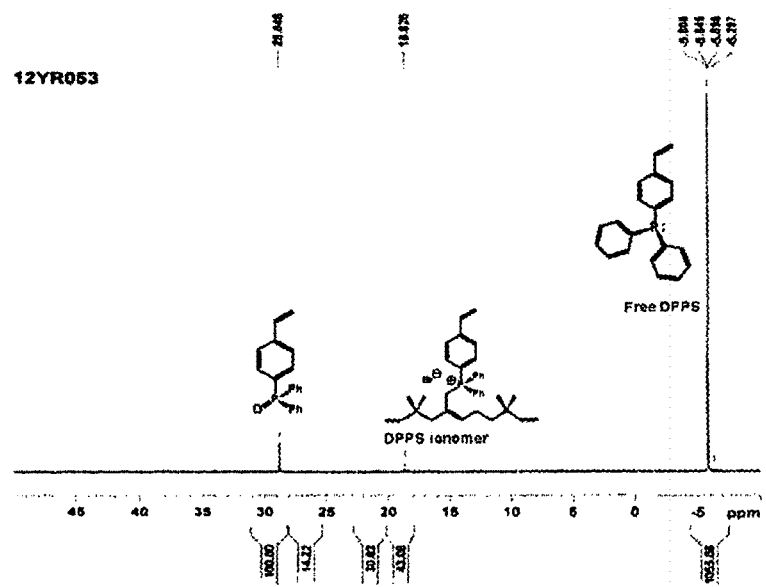
FIG. 7 shows a $^{31}$P-NMR of BB2030™-DPPS formulation mixed in a Brabender at 60° C. for 6 minutes.

Proton and Phosphorous NMR analysis (1H- & $^{31}$P-NMR) of BB2030™-DPPS butyl rubber ionomer mixed in the Brabender can confirm the presence or absence of ionomer formation. Both the proton and phosphorous NMR revealed ~4% of the free DPPS had been converted to the ionomeric form after mixing in a Brabender at 60° C. for 6 minutes. The phosphorous NMR is shown in FIG. 7 indicating the small amount of non-DPPS ionomer, which is a negligible amount.

Figure 8:
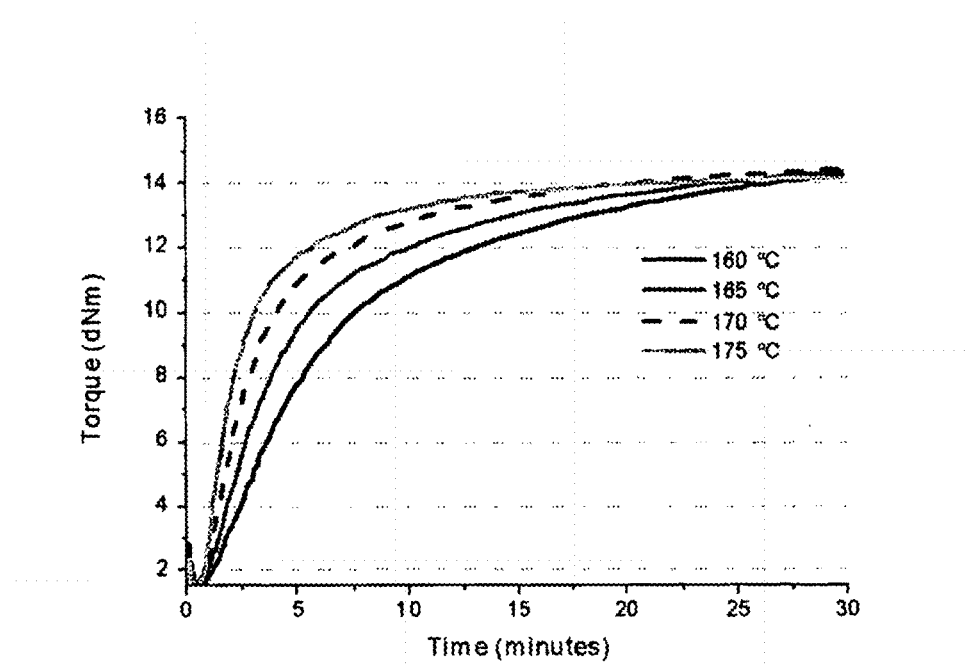
FIG. 8 shows a plot of MDR (using frequency oscillation of 1.7 Hz and 1° Arc) for BB2030™-DPPS butyl rubber ionomer at various temperatures for 30 minutes.

PDMS has a know degradation temperature of 343° C. However, changes in the surface morphology of the PDMS coated onto the Si wafer were observed after each cure for 8 minutes at 175° C. Reusing these wafers resulted in butyl sheets with the same changes in surface morphology across the sheet. Hence the PDMS coated wafers were only appropriate for one time use at 175° C. In the interest of keeping fabrication costs down various cure temperatures for BB2030™-DPPS butyl rubber were investigated. It was observed that the PDMS coated wafers used to cure butyl rubber at 160° C. showed no change in the surface morphology of the PDMS coating after repeated use. This indicates that PDMS coated wafers could be continually reused if the cure temperature was 160° C. The cure temperatures investigated were 160, 165, 170 and 175° C. (see FIG. 8). The fastest rate of cure with the highest rise in torque is obtained at 175° C. with a t90 of 8.30 min. and torque value of 13.67 dNm. Upon lowering the temperature, the rate of cure and rise in torque decreased. Hence, curing at lower temperatures for a longer period of time allows the reuse of PDMS coated Si wafers.

Figure 9:
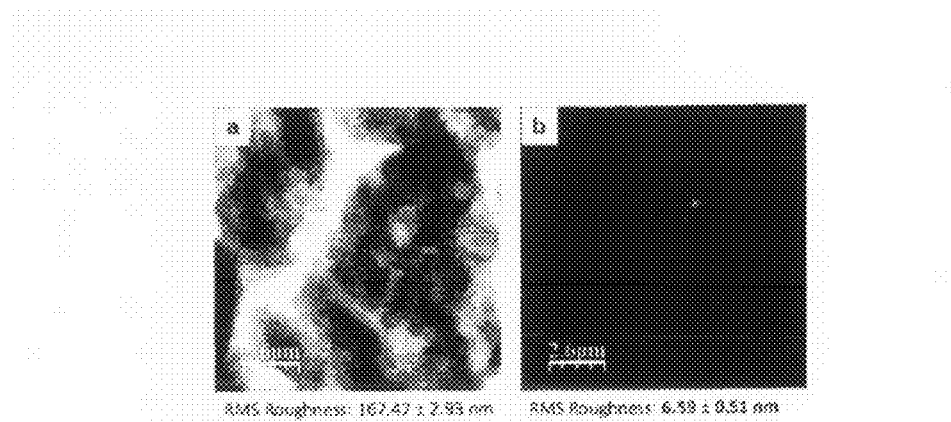
FIG. 9a shows AFM images of BB2030™-DPPS butyl rubber ionomer cured between Teflon®.
FIG. 9b shows AFM images of BB2030™-DPPS butyl rubber ionomer cured between cured against PDMS coated Si wafers.

Atomic Force Microscopy (AFM) images were collected in order to study the surface roughness of the BB2030™-DPPS butyl rubber sheets obtained via two cure methods. The first, by pressing BB2030™-DPPS butyl rubber between Teflon® sheets and the second was by pressing the rubber against PDMS coated silicon wafers. Surface roughness was quantified the surface roughness using AFM images of both cured BB2030™-DPPS butyl sheets. A large RMS roughness of 167.47±2.93 nm was obtained for the sample pressed between Teflon® sheets (FIG. 9a). However, when BB2030™-DPPS butyl rubber was pressed against PDMS coated silicon wafers on both sides, a much smoother surface was obtained with an RMS roughness of 6.59±0.51 nm (FIG. 9b). In flexible electronics applications, high surface roughness is challenging due to poor contact caused by large hills and valleys formed across the surface. Low surface roughness provides an air-tight moisture free contact when used as an encapsulant and will not disrupt conductivity when used in an electrode.

Figure 10:
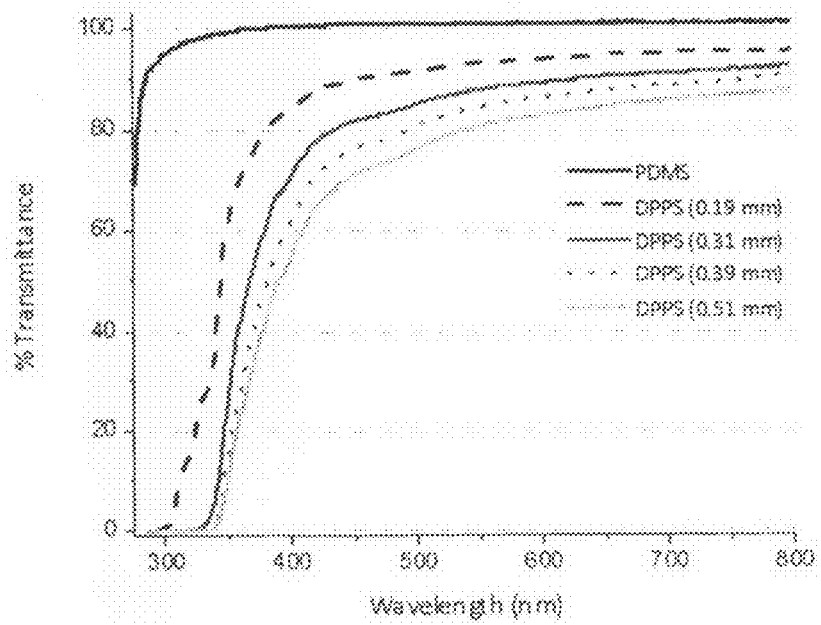
FIG. 10 shows transmission spectra for PDMS and BB2030™-DPPS butyl rubber ionomer sheets from thickness 0.2-0.5 mm.
Figure 11:
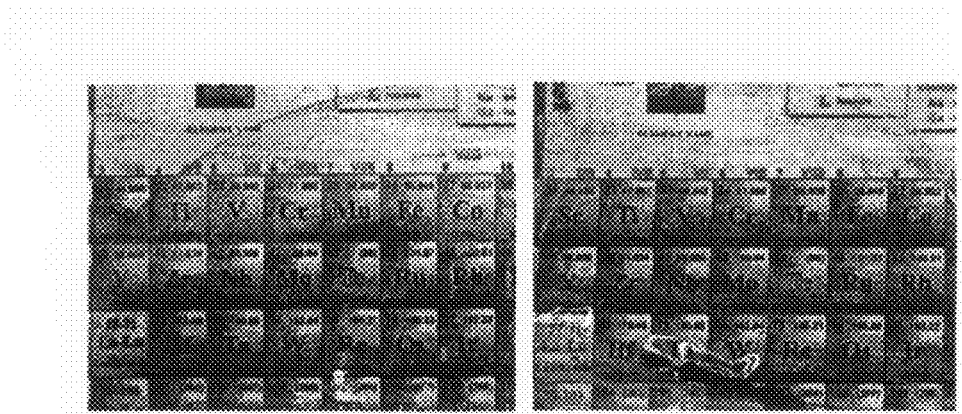
FIG. 11 shows Images of PDMS 1 mm thick (left) and BB2030™-DPPS butyl rubber ionomer 0.5 mm thick (right) illustrating the optical transparency of the materials.

The optical transparency of BB2030™-DPPS butyl rubber was investigated to determine it's usefulness as a replacement for PDMS in electronics such as solar cells and LEDs. PDMS is optically transparent but highly permeable to moisture and gases. Butyl rubber has the advantage of being both impermeable to moisture and gas and highly transparent in the visible region. BB2030™-DPPS butyl rubber sheets were cured with varying thickness from 0.2 mm to 0.5 mm to determine how transmissive the sheets were (FIG. 10). The sheets were 83-92 percent transmissive at 630 nm, with the transparency decreasing by only 10% with more than doubling sheet thickness. A comparison photograph showing both PDMS and BB2030™-DPPS butyl rubber ionomer sheets is provided in FIG. 11.

Additional experiments confirm that curing against PDMS results in butyl rubber with low surface roughness. Low surface roughness appears to be important in obtaining optical transparency, as does low porosity. Curing against various substrates confirms that PDMS coated substrates produced the lowest surface roughness and highest optical transparency for the cured butyl sheets, although other surfaces produced a surface roughness and optical transparency suitable for some applications. Comparisons with other unfilled butyl formulations (peroxide cured BB2030™ and RB70) showed that at least RB70 also produced an optically transparent sheet, although the properties of the unfilled sheet, even when peroxide cured, were generally inferior to the BB2030™-DPPS butyl rubber. In particular, the rheological properties, physical strength and oxygen permeation rate for the RB70 peroxide cured samples were inferior to those of the BB2030™-DPPS samples. It was qualitatively observed that, even when peroxide cured, the RB70 surfaces were highly tacky and not suitable for further processing and handling applications.

Variable Temperature Experiments

Figure 19:
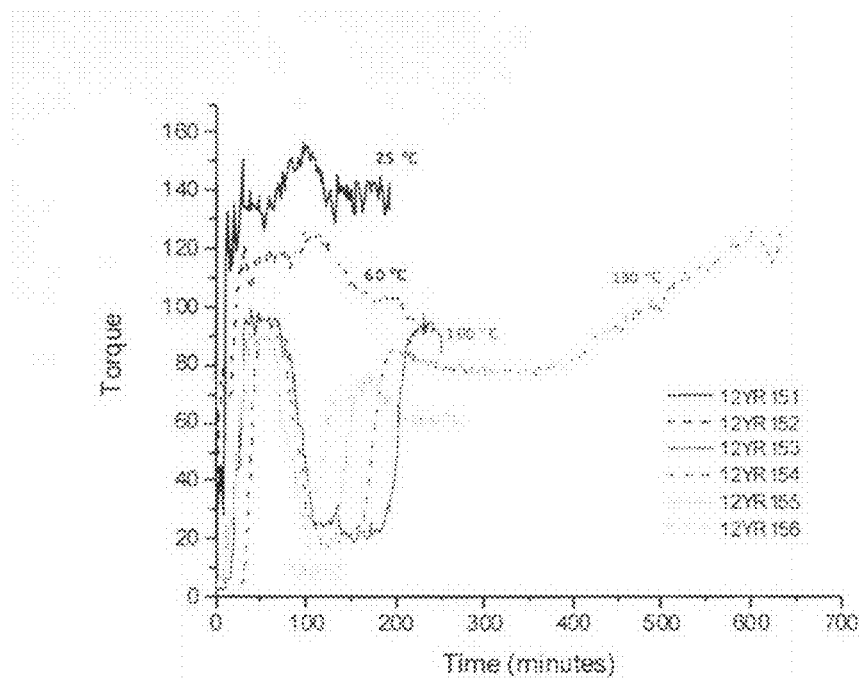
FIG. 19 shows the change in Torque at various mixing temperatures when DPPS was mixed with BB2030™ in a Brabender internal mixer with Banbury shears.

DPPS-BB2030™ was mixed in the Brabender mixer at various temperatures to establish viable temperature ranges for mixing to ultimately produce optically transparent IIR with low surface roughness. DPPS was mixed in the Brabender (Banbury shears) with BB2030™ at the following temperatures: 25, 60, 100, 130 and 160° C. These temperatures where chosen to determine if the formation of ionomer in situ had any effect on the molding and ultimately transparency and surface roughness of the cured rubber sheets. The formulations remained the same as 12YR110 and are listed in Table 8. The mixing curves of DPPS-BB2030™ at the studied temperatures are plotted in FIG. 19. As shown in the plot, mixing DPPS at 25 and 60° C. shows the expected rise in torque when DPPS is incorporated into the rubber and no visible change in the torque after this. However, once the mixing temperature is increased to 100° C. there is melting of DPPS at 90 seconds followed by then another rise in torque after an additional 70 seconds, indicating formation of ionomer. It has been shown that DPPS ionomer is formed after 10 minutes at 130° C. Mixing was then done at 130° C. with the mixing terminated after 200 seconds and then after 700 seconds to determine if there was any difference in amount of ionomer formed. Both showed similar mixing curves as the one mixed at 100° C., indicating ionomer formation shortly after DPPS melts except with the extended time mixing there was another small gradual increase in torque from 450-700 seconds. This likely indicates higher conversion of ionomer. The mixing curve observed at 160° C. indicated formation of ionomer directly after DPPS melts. Higher mixing temperatures were not investigated since butyl rubber degrades at higher temperatures so even though ionomer formation is occurring the butyl rubber will still be degrading.

Figure 20:
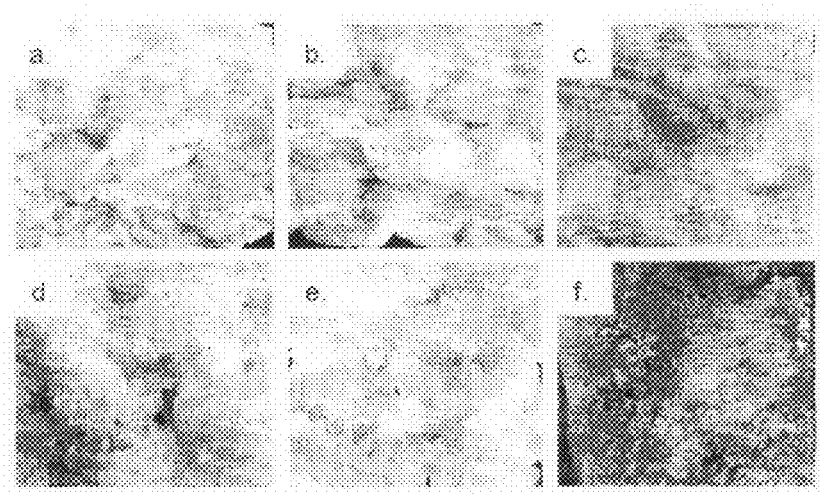
FIG. 20 shows images taken of DPPS-BB2030™ after refining on the mill for formulations mixed at (a) 25° C. (12YR151), (b) 60° C. (12YR152), (c) 100° C. (12YR153), (d) 130° C. (12YR154) (e) 130° C. (12YR155; in situ ionomer formation) and (f) 160° C. (12YR156).

The peroxide was added in the Brabender for mixes done at 25 and 60° C., 30 seconds before dumping the material. For the higher temperature mixes the peroxide was added on the mill. All formulations were refined on the mill except for the mix done at 160° C. since the DPPS-BB2030™ was unable to band due to high ionomer conversion. Images for each after milling are shown in FIG. 20. Formation of ionomer at temperatures above 130° C. resulted in rippled butyl with a rough cross-linked texture.

Figure 21:
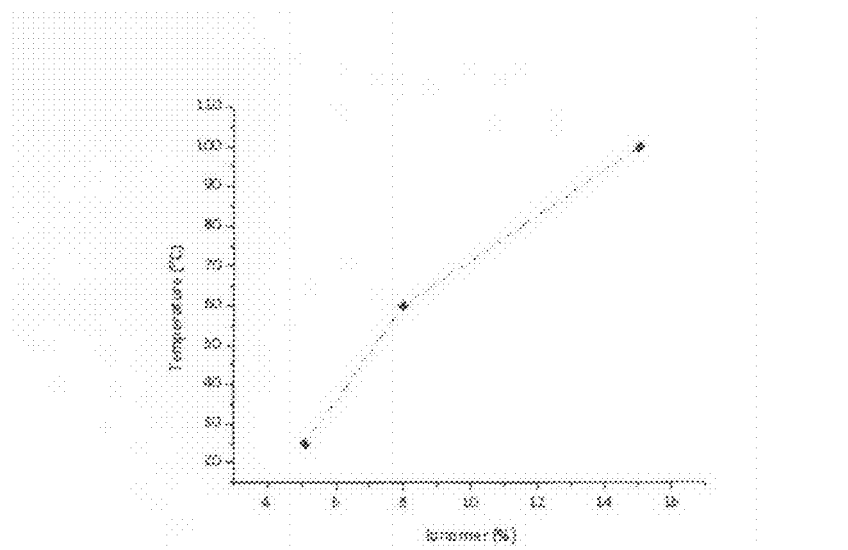
FIG. 21 shows a plot of Ionomer conversion vs. Mixing Temperature of DPPS-BB2030™ (12YR151-153) from 25-100° C. Ionomer conversion could not be quantified at 130° C. or higher due high ionomer conversion and premature cross-linking which rendered the samples insoluble.

Proton and Phosphorous NMR analysis ($^1$H- & $^{31}$P-NMR) of BB2030™-DPPS butyl rubber mixed in the Brabender can confirm the presence or absence of ionomer formation. Samples from mixes done at temperatures as high as 100° C. were capable of dissolving in a solvent, however the mixes at 130° C. or higher did not dissolve which indicates too high of ionomer formation to dissolve the rubber. From the $^{31}$P-NMR shown in FIG. 7, free DPPS has a shift of 5.9 ppm, the ionomeric form has a shift of 18.7 ppm and the oxidized form of free DPPS has a shift of 28.9 ppm. Both the proton and phosphorous NMR revealed increasing conversion of DPPS to the ionomeric form with an increase in mixing temperature (See FIG. 21). When mixing at 25° C. (12YR151), 5.10% of the free DPPS had been converted to the ionomeric form. This conversion increased to 7.98% when mixed at 60° C. (12YR152) and 15.03% when mixed at 100° C. (12YR153). Higher mixing temperatures lead to increased ionomeric conversions and premature cross-linking that rendered the samples insoluble so conversions were not further quantified.

Figure 22:
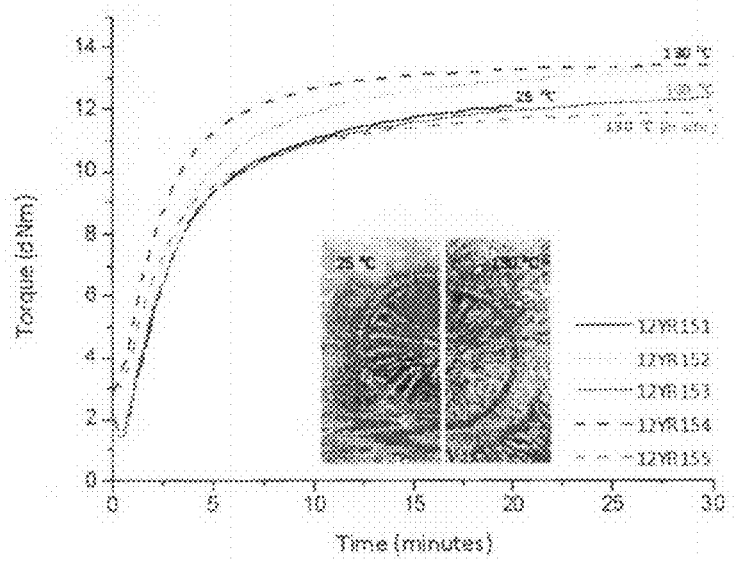
FIG. 22 shows an MDR plot (using frequency oscillation of 1.7 Hz and 1° Arc) of BB2030™-DPPS butyl rubber at 175° C. for 20-30 minutes for the various mixing temperatures from 25-130° C. Inset picture of rubber cured via MDR showing uniform texture at 25° C. and rippled texture at 130° C.
Figure 23:
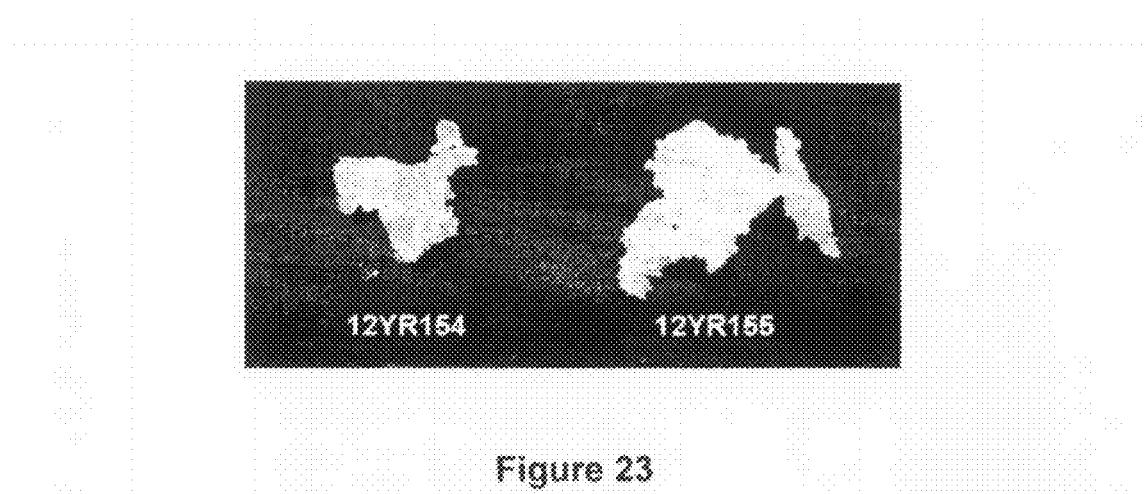
FIG. 23 shows an image of 12YR154 and 12YR155 taken after samples were shaken in toluene for two days.

MDR curves obtained from 12YR151-12YR155 are represented in FIG. 22. The delta torques for formulations mixed at lower temperatures showed little variation from compounds 12YR151 through 12YR153 (see Table 13). 12YR151 (mixed at 25° C.) had a delta torque of 10.68 dNm, 12YR152 (mixed at 60° C.) was 11.80 dNm and 12YR153 (mixed at 100° C.) was 10.73 dNm. However, ionomer being formed during mixing at temperatures as high as 130° C. resulted in lower delta torques from the MDR curves with 12YR154 (mixed at 130° C.) being 9.95 dNm and 12YR155 (mixed at 130° C.; in situ ionomer formation) was 8.97 dNm. This decrease in the delta torque is due to ionomer formation occurring in the Brabender mixer instead of during curing after the curatives were incorporated. This effect was clearly observed in the images of compounds after the MDR was run in which the preformed ionomer and premature cross-linking in 12YR154 resulted in a "nervy" cured state of the butyl rubber and 12YR151 showed the typically uniform cured surface (see FIG. 22; inset). This "nervy" texture results from a lot of ionic associations which ultimately result in shrinkage and low flow, which is confirmed by the higher ML value for both 12YR154 and 12YR155 indicating it's already cross-linked. To confirm that the styrene functionality on DPPS was cross-linking with BB2030™, uncured samples of 12YR154 and 12YR155 were shaken in toluene for two days (see FIG. 23). Both 12YR154 and 12YR155 samples did not dissolve, indicating that additionally to ionomer formation there was premature cross-linking occurring.

TABLE 13

MDR testing results from peroxide cured BB2030 ™-
DPPS butyl rubber at 175° C. for t90 + 5 minutes
for the various mixing temperatures.

| Compound | Mixing Temperature (° C.) | MH-ML (dNm) | t90 (min.) | Cure texture |
|---|---|---|---|---|
| 12YR151 | 25 | 10.68 | 9.96 | uniform |
| 12YR152 | 60 | 11.80 | 10.79 | uniform |
| 12YR153 | 100 | 10.73 | 12.04 | uniform |
| 12YR154 | 130 | 9.95 | 8.29 | "nervy"/rippled |
| 12YR155 | 130 (in situ) | 8.97 | 10.72 | "nervy"/rippled |
| 12YR156 | 160 | — | — | — |

Physical Testing (Stress strain dumbbells were cured at 175° C. for t90+5 minutes): Stress/strain properties were tested using the T2000 tensile tester. The ASTM D412 procedure was followed to test samples that were unaged and the median of 3 values was taken as the result. Hardness was tested using the Shore A Hardness Tester according to ASTM D2240. Three cured dumbbells (to be used for tensile testing) were stacked on each other to make the sample the proper height. The median of 5 values was taken as the result. The physical properties of 12YR151, 12YR152, and 12YR153 were similar to results obtained for 12YR053. The high temperature mixing, 12YR154 and 12YR155, resulted in "nervy" rubber that did not flow well which led to defects in the cured sheets. Due to these defects the dumbbells broke early and the data for both should be disregarded.

TABLE 14

Physical testing results from peroxide cured BB2030 ™-DPPS butyl
rubber which was initially mixed in a Brabender over a range
of temperatures. IIR was cured at 175° C. for t90 + 5 min.

| Physical property | 12YR151 | 12YR152 | 12YR153 | 12YR154 | 12YR155 |
|---|---|---|---|---|---|
| $t_{cure}$ (min) | 15 | 16 | 17 | 13 | 16 |
| Hardness (ShoreA) | 42 | 43 | 42 | 43 | 45 |
| Tensile strength (MPa) | 3.10 | 3.48 | 3.44 | 1.98 | 1.96 |
| Ultimate elongation (%) | 201 | 250 | 200 | 118 | 145 |
| Modulus @ 25% (MPa) | 0.40 | 0.42 | 0.42 | 0.47 | 0.45 |
| Modulus @ 50% (MPa) | 0.61 | 0.64 | 0.62 | 0.76 | 0.73 |
| Modulus @ 100% (MPa) | 0.97 | 1.01 | 1.00 | 1.55 | 1.30 |

Figure 24:
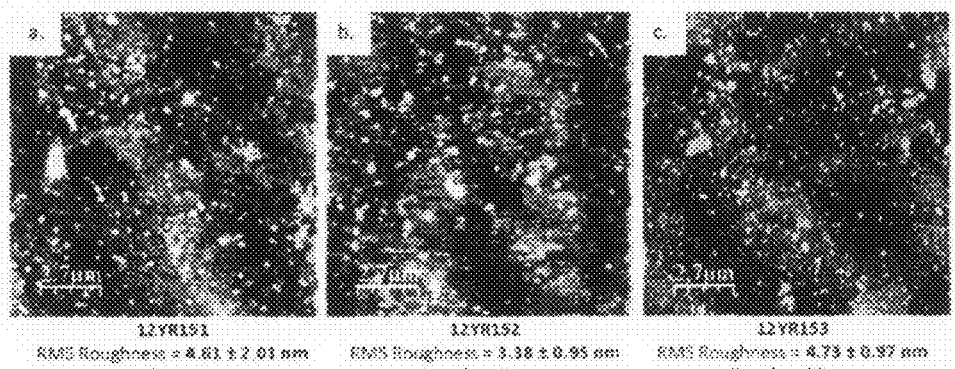
FIG. 24 shows AFM images of DPPS-BB2030™ cured against PDMS coated 3" Si wafers at 175° C. for 9 min which was initially mixed in a Brabender at (a) 25° C. (12YR151), (b) 60° C. (12YR152) and (c) 100° C. (12YR153). The RMS roughness for each is listed below the image. The RMS roughness of samples 12YR154 (130° C.) and 12YR155 (130° C.; in situ ionomer formation) could not be measured due to the high degree of roughness and non-uniformity across the surface.

The low temperature mixes from 25 to 100° C. all yielded optically transparent cured rubber sheets. However, ionomer formation and premature cross-linking with Brabender mixing at 130° C. ultimately decreased the optical transparency of both 12YR154 and 12YR155 cured sheets, resulting in poor flow so the rubber did not mold uniformly. The AFM images for 12YR151-12YR153 are shown in FIG. 24 along with the corresponding RMS roughness. AMF imaging was not done on 12YR154 or 12YR155 since the surface was too rough to measure via this technique. 12YR151-12YR153 all show low surface roughness associated with curing against PDMS coated wafers.

Figure 25:
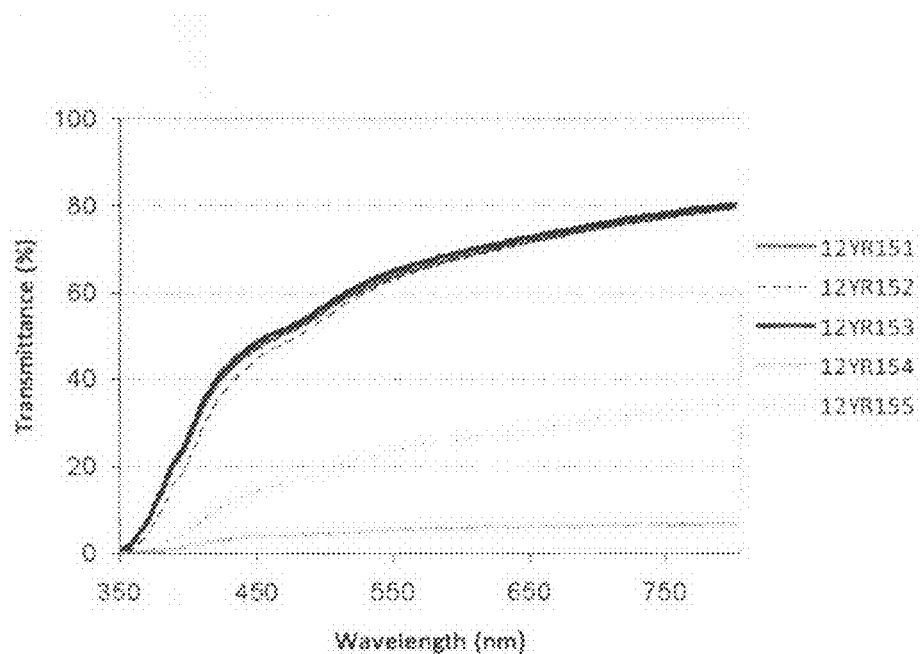
FIG. 25 shows transmission spectra of cured DPPS-BB2030™ sheets (~1 mm thick) that were mixed in a Brabender at various temperatures; 25° C.; 12YR151 (dark grey), 60° C.; 12YR152 (black; dash), 100° C.; 12YR153 (black), 130° C.; 12YR154 (light grey) and 130° C.; 12YR155 (in situ ionomer formation) (dark grey; dot).

The transmission spectra for 12YR151-12YR155, shown in FIG. 25, confirm that mixing at elevated temperatures results in a sizable loss in optical transparency. DPPS-BB2030™ mixed from 25-100° C. show little change in optical transparency, all being 72% transmissive at 630 nm. However, 12YR154 was only 6% transmissive (at 630 nm) and 12YR155 was 28% transmissive (at 630 nm). This confirms that ionomer formation and any premature cross-linking in a Brabender at temperatures of 130° C. or higher result in butyl rubber sheets which are not optically transparent and would not be useful for applications requiring high transmission.

The optical transparency of DPPS-BB2030™ was investigated with increasing amounts of Aerosil 8200, a transparent filler, in order to determine what effect the filler had on transparency and how the physical properties could be tuned. DPPS-BB2030™ was compounded and cured in the same manner as previously mentioned except that the peroxide curing agent was liquid peroxide which was added on the mill before refinement. The four compounds studied were DPPS-BB2030™ with Aerosil 8200 in 5, 10, 20 and 30 phr (Table 15). Higher filler loading was not investigated due to difficulty in getting 30 phr into the mixer. The rheological testing results obtained using an MDR are tabulated in Table 16. The delta torques increase with increasing amounts of filler, ranging from 9.59 dNm for 12YR147 (unfilled) to 16.42 dNm for 12YR145 (30 phr Aerosil). Increasing the filler also corresponds with slightly longer cure times (t90). Increasing the filler in DPPS-BB2030™ results in increasing hardness, modulus and ultimate elongation (see Table 17). In this way, the DPPS-BB2030™ formulation can be tuned to give desired physical properties.

TABLE 15

Peroxide cured DPPS-BB2030 ™
formulations with increasing silica filler.

| Ingredient (PHR) | 12YR147 | 12YR139 | 12YR141 | 12YR143 | 12YR145 |
|---|---|---|---|---|---|
| BB2030 ™ | 100 | 100 | 100 | 100 | 100 |
| DPPS | 5 | 5 | 5 | 5 | 5 |
| Aerosil 8200 | — | 5 | 10 | 20 | 30 |
| Luperox 101 | 0.14 | 0.14 | 0.14 | 0.14 | 0.14 |

TABLE 16

Rheological testing results from DPPS-BB2030 ™ formulations with
increasing silica filler using MDR (1 degree arc, 1.7 Hz, 175° C., 30 min).

| MDR results | 12YR147 | 12YR139 | 12YR141 | 12YR143 | 12YR145 |
|---|---|---|---|---|---|
| MH (dNm) | 11.15 | 12.31 | 14.09 | 16.32 | 18.59 |
| ML (dNm) | 1.56 | 1.67 | 1.76 | 1.94 | 2.17 |
| MH-ML (dNm) | 9.59 | 10.64 | 12.33 | 14.38 | 16.42 |
| ts2 (min) | 0.77 | 0.75 | 0.71 | 0.71 | 0.68 |
| t90 (min) | 3.33 | 3.55 | 3.63 | 4.36 | 4.69 |

TABLE 17

Physical testing results from DPPS-BB2030 ™ formulations with
increasing silica filler cured at 175° C. for t90 + 5 min.

| Physical property | 12YR147 | 12YR139 | 12YR141 | 12YR143 | 12YR145 |
|---|---|---|---|---|---|
| $t_{cure}$ (min) | 8 | 9 | 9 | 9 | 9 |
| Hardness (ShoreA) | 41 | 43 | 48 | 48 | 57 |
| Tensile strength (MPa) | 2.51 | 3.33 | 4.15 | 6.40 | 6.93 |

TABLE 17-continued

Physical testing results from DPPS-BB2030 ™ formulations with increasing silica filler cured at 175° C. for t90 + 5 min.

| Physical property | 12YR147 | 12YR139 | 12YR141 | 12YR143 | 12YR145 |
|---|---|---|---|---|---|
| Ultimate elongation (%) | 162 | 167 | 167 | 214 | 231 |
| Modulus @ 25% (MPa) | 0.40 | 0.42 | 0.54 | 0.61 | 0.80 |
| Modulus @ 50% (MPa) | 0.63 | 0.68 | 0.90 | 0.99 | 1.25 |
| Modulus @ 100% (MPa) | 1.22 | 1.33 | 1.83 | 1.88 | 2.30 |
| Modulus @ 200% (MPa) | — | — | — | — | 5.59 |

Figure 26:
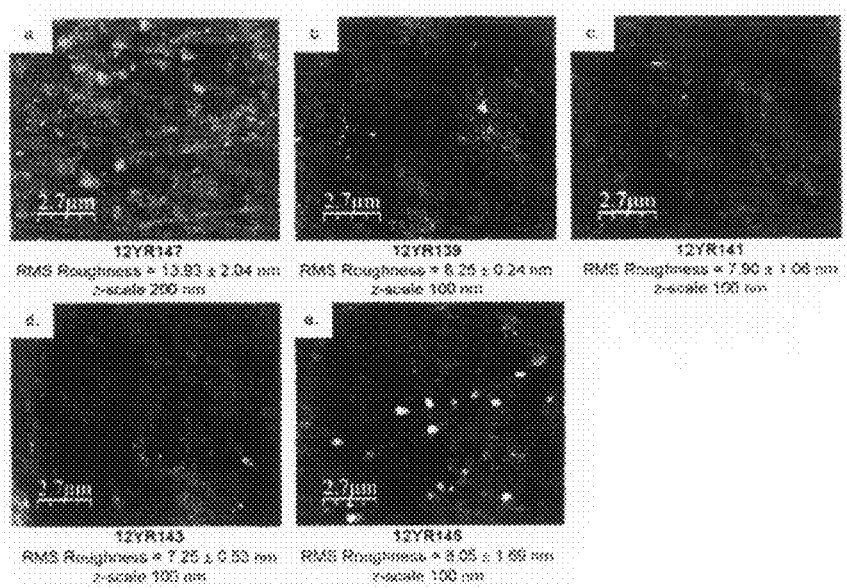
FIG. 26 shows AFM images of DPPS-BB2030™ formulations with liquid peroxide and increasing amounts of silica filler; (a) no filler (12YR147), (b) 5 phr (12YR139), (c) 10 phr (12YR141), (d) 20 phr (12YR143) and (e) 30 phr Aerosil 8200 (12YR145). The RMS roughness for each compound is listed under each image.

All formulations were peroxide cured against PDMS coated Si wafers; surface roughness was measured via AFM imaging and optical transparency measured via UV-Vis spectroscopy. All appeared to possess the same optical transparency. However, the rubber sheets exhibited a darker yellow colour not previously observed with DPPS-BB2030™ peroxide cured with peroxide on a solid support. AFM images of DPPS-BB2030™ formulations with liquid peroxide and increasing amounts of silica filler and shown in FIG. 26, with their corresponding RMS roughness below each image. The unfilled 12YR147 had the highest roughness of 13.93±2.04 nm, which is still considerably low. All other formulations with Aerosil had low rms roughness ranging from 6.26±0.24 nm for 12YR139 (5 phr filler) to 8.05±1.69 nm for 12YR145 (30 phr).

Figure 27:
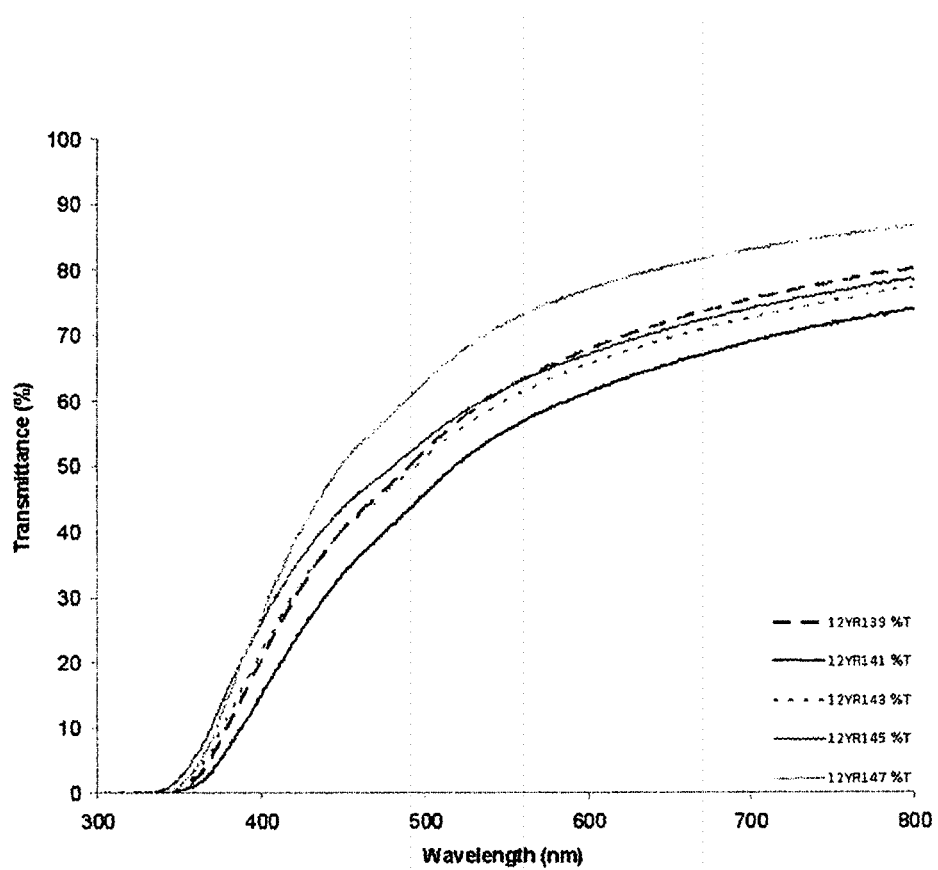
FIG. 27 shows transmission spectra of DPPS-BB2030™ formulations with liquid peroxide and increasing amounts of silica filler; (a) no filler; 12YR147 (light grey), (b) 5 phr; 12YR139 (black; dash), (c) 10 phr; 12YR141 (black), (d) 20 phr; 12YR143 (dark grey dash) and (e) 30 phr Aerosil 8200; 12YR145 (dark grey).

The transmission spectra for 12YR139-12YR147 with increasing Aerosil filler from 0-30 phr is shown in FIG. 27. The unfilled 12YR147 is 79% transmissive (@630 nm), only 5% less than 12YR110. The optical transparency drops to 71% with the addition of 5 phr filler and even further to 64% with 10 phr filler (Table 18). The optical transparency however increases with an increase in filler to 20 and 30 phr being 68 and 70% transmissive, respectively.

TABLE 18

Optical transparency of DPPS-BB2030 ™ (with increasing Aerosil 8200) cured sheets (~1.0 mm thick) based on curing against PDMS coated Si wafers at 175° C. for 9 min.

| IIR | Optical transparency (@ 630 nm) |
|---|---|
| 12YR147 | 79% |
| 12YR139 | 71% |
| 12YR141 | 64% |
| 12YR143 | 68% |
| 12YR145 | 70% |

Alternative Release Agents

Figure 28:
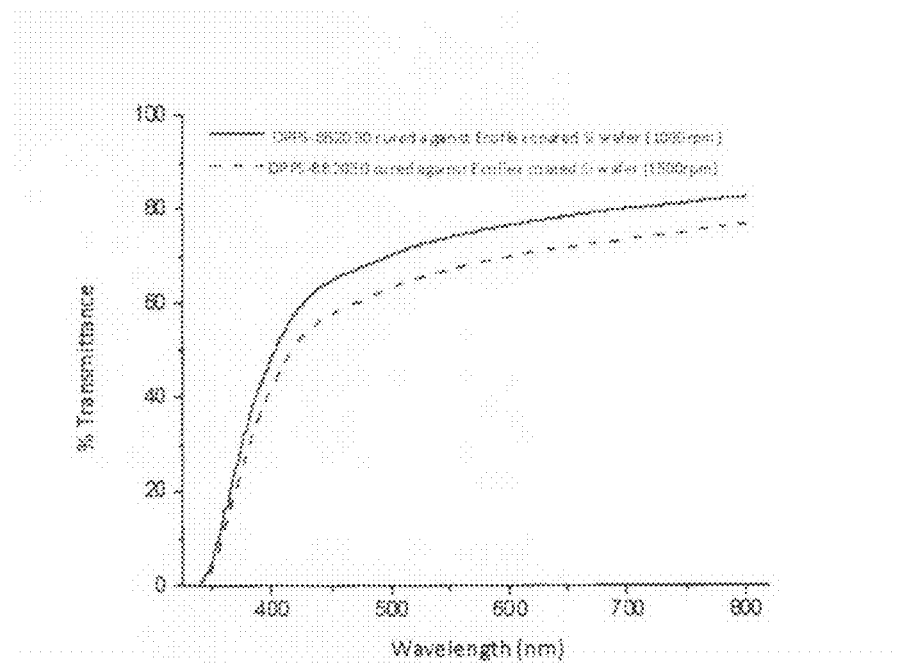
FIG. 28 shows transmission spectra of DPPS-BB2030™ formulation (12YR110) cured against Ecoflex™ spin-coated silicon wafers, which were spin-coated at 1000 rpm (shown in black) and 1500 rpm (shown in black; dash).

Spin-coated Ecoflex™ (a silicone polymer) was tested as an alternative to spin-coated PDMS to give easy release when curing DPPS-BB2030™ sheets, which result in rubber sheets with low surface roughness and high optical transparency. Ecoflex™ coated wafers did also serve as an easy release layer after curing IIR sheets and the resulting IIR sheets were optically transparent, see FIG. 28. The optical transparency was 78% (@630 nm) for DPPS-BB2030™ cured against Ecoflex™ spin-coated at 1000 rpm and 72% (@630 nm) for DPPS-BB2030™ cured against Ecoflex™ spin-coated at 1500 rpm.

TABLE 19

Optical transparency of DPPS-BB2030 ™ IIR sheets (~0.5 mm thick) based on curing against Ecoflex ™ and PDMS coated silicon wafers.

| Cure substrate | Optical transparency (@ 630 nm) |
|---|---|
| PDMS-Si wafer | 84% |
| Ecoflex (1000 rpm)-Si wafer | 78% |
| Ecoflex (1500 rpm)-Si wafer | 72% |

Figure 29:
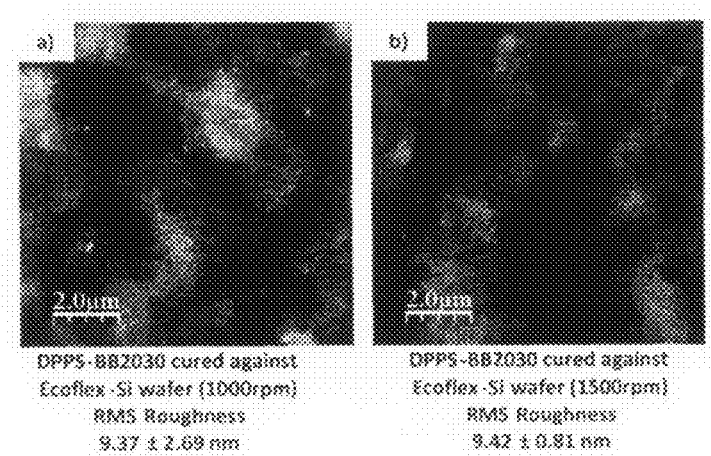
FIG. 29 shows AFM images of DPPS-BB2030™ formulation cured against Ecoflex spin-coated onto Si wafers at 1000 rpm (a) and 1500 rpm (b). The RMS roughness for each compound is listed under each image. The z-scale is 75 nm.

AFM images were obtained and RMS surface roughness measured for the DPPS-BB2030™ formulation cured against Ecoflex™ spin-coated onto Si wafers at 1000 rpm and 1500 rpm (see FIG. 29). The RMS roughness for was low and is listed under each AFM image.

Based on the foregoing, it has been shown that the BB2030™-DPPS butyl rubber formulations peroxide cured against PDMS coated substrates provide a desirable balance of optical transparency, low oxygen permeation rate, physical strength and toughness, and low surface tackiness that is suitable for a variety of applications where flexible, impermeable and optically transparent coatings are desirable. Such applications may include, for example, coatings or encapsulants for opto-electronics.

Although the invention has been described in detail in the foregoing for purposes of illustration, it is understood that such detail is solely for that purpose and that variations can be made therein by those skilled in the art without departing from the spirit and scope of the invention except as it may be limited by the claims.

What is claimed:

1. A process for producing an optically transparent, peroxide cured article made from a peroxide curable butyl rubber ionomer, the process comprising:
   admixing:
      a halogenated butyl rubber polymer comprising repeating units derived from at least one isoolefin monomer, repeating units derived from one or more multi-olefin monomers, and at least an allylic halogen moiety;
      a nitrogen or phosphorous based nucleophile comprising a pendant vinyl group; and
      a peroxide curing agent to produce a curable mixture;
   disposing the curable mixture on a heated surface having an RMS surface roughness of less than 10 nm; and
   curing the mixture under conditions sufficient for curing the mixture with the peroxide curing agent to produce a cured article.

2. The process according to claim 1, further comprising:
   first admixing the nucleophile with the polymer at a temperature of 25 to 100° C. to react the allylic halogen moiety with the nucleophile to produce a peroxide curable butyl rubber ionomer; and,
   subsequently admixing the peroxide curing agent with the peroxide curable butyl rubber ionomer to produce the curable mixture.

3. The process according to claim 1, wherein:
   the heated surface comprises two heated surfaces having an RMS roughness of 0.1 to 10, and the process comprises disposing the curable mixture between the heated surfaces; and
   the nucleophile is admixed with the polymer at a temperature of 25 to 60° C.

4. The process according to claim 1, wherein the process comprises substantially simultaneously admixing the peroxide curing agent with the halogenated butyl rubber polymer and the nucleophile and then simultaneously reacting the peroxide curing agent with the halogenated butyl rubber polymer and/or the nucleophile.

5. The process according to claim 1, wherein the peroxide curing agent comprises at least one of dicumyl peroxide, di-tert-butyl peroxide, benzoyl peroxide, 2,2'-bis (tert.-butylperoxy) diisopropylbenzene, benzoyl peroxide, 2,5-dimethyl-2,5-di(tert-butylperoxy)-hexyne-3, 2,5-dimethyl-2,5-di(benzolyperoxy)hexane, and 2,5-bis(tert-butylperoxy)-2,5-dimethyl hexane.

6. The process according to claim 1, further comprising adding 0.7 to 7 phr of the peroxide curing agent.

7. The process according to claim 2, further comprising admixing a peroxide curing co-agent with the peroxide curing agent and the ionomer, wherein the co-agent comprises at least one of triallyl isocyanurate (TAIC), N,N'-m-phenylene dimaleimide, triallyl cyanurate (TAC) and liquid polybutadiene.

8. The process according to claim 1, wherein the ionomer is unsaturated and an amount of unsaturation comprises a sum total of the unsaturation of the butyl rubber and the unsaturation of the pendant vinyl group, and the amount of unsaturation is greater than or equal to 1.0 mol %.

9. The process according to claim 1, further comprising coating the heated surface with a release layer, wherein the release layer comprises at least one of poly(dimethylsiloxane) (PDMS), silicone rubber polymer, and a fluoropolymer.

10. The process according to claim 1, wherein the curing comprises curing the mixture at a temperature of 100 to 200° C. for a curing time of 1 to 30 minutes.

11. The process according to claim 10, wherein the curing temperature is 160-175° C.

12. The process according to claim 1, wherein
disposing the curable mixture comprising disposing the curable mixture between two heated surfaces, each having en RMS surface roughness of less than 10 nm, and
curing the mixture produces the cured article between the two heated surfaces, and the method further comprises releasing the article from between the heated surfaces at a release temperature of less than or equal to 100° C.

13. The process according to claim 1, wherein the release temperature is greater than or equal to 30° C.

14. The process according to claim 1, wherein the RMS surface roughness of the cured article is less than 7 nm.

15. The process according to claim 1, wherein the article has a thickness and at least a portion of the article exhibits an optical transparency of at least 75% to a wavelength of 630 nm at a thickness of less than or equal to 0.51 mm.

* * * * *